(12) United States Patent
Fowe

(10) Patent No.: US 11,237,007 B2
(45) Date of Patent: Feb. 1, 2022

(54) DANGEROUS LANE STRANDS

(71) Applicant: HERE Global B.V., Eindhoven (NL)

(72) Inventor: James Fowe, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 258 days.

(21) Appl. No.: 16/299,815

(22) Filed: Mar. 12, 2019

(65) Prior Publication Data
US 2020/0292338 A1 Sep. 17, 2020

(51) Int. Cl.
| G01C 21/34 | (2006.01) |
|---|---|
| G06F 16/29 | (2019.01) |
| G08G 1/01 | (2006.01) |
| G08G 1/0967 | (2006.01) |
| G01C 21/00 | (2006.01) |

(52) U.S. Cl.
CPC ..... *G01C 21/3461* (2013.01); *G01C 21/3804* (2020.08); *G06F 16/29* (2019.01); *G08G 1/0133* (2013.01); *G08G 1/0141* (2013.01); *G08G 1/096775* (2013.01)

(58) Field of Classification Search
CPC ..... G01C 21/3461; G01C 21/32; G06F 16/29; G08G 1/0133
See application file for complete search history.

(56) References Cited

U.S. PATENT DOCUMENTS

| 5,910,177 | A * | 6/1999 | Zuber | G01C 21/3658 701/410 |
|---|---|---|---|---|
| 6,463,290 | B1 * | 10/2002 | Stilp | H04W 4/90 455/456.1 |
| 9,081,650 | B1 | 7/2015 | Brinkmann | |
| 9,200,910 | B2 * | 12/2015 | Fowe | G01C 21/34 |
| 9,651,390 | B1 * | 5/2017 | Thompson | G01C 21/367 |
| 9,928,432 | B1 | 3/2018 | Sathyanarayana | |
| 10,173,695 | B2 * | 1/2019 | Stenneth | G08G 1/096716 |
| 10,794,711 | B2 * | 10/2020 | Wheeler | G05D 1/0088 |
| 2008/0300733 | A1 * | 12/2008 | Rasshofer | G01S 13/931 701/1 |
| 2011/0074209 | A1 * | 3/2011 | Ueno | B60T 13/745 303/20 |
| 2011/0241417 | A1 * | 10/2011 | Miyazaki | B60T 8/404 303/2 |
| 2012/0173530 | A1 * | 7/2012 | Kurciska | B60T 8/404 303/2 |

(Continued)

FOREIGN PATENT DOCUMENTS

| AU | 2017254915 | | 7/2018 | |
| CN | 101875348 A | * | 11/2010 | G08G 1/056 |

(Continued)

*Primary Examiner* — Behrang Badii
*Assistant Examiner* — Jalal C Coduroglu
(74) *Attorney, Agent, or Firm* — Lempia Summerfield Katz LLC

(57) ABSTRACT

An apparatus and method are disclosed for calculation of a dangerous road strand of a roadway. Probe data for a roadway having multiple lanes is identified. A subset of the probe data for a predetermined lane is selected and values for a change in velocity for multiple sequences in the subset of probe data are calculated. Based on clustering for the change in velocity and a danger value, the dangerous road strand is identified. The dangerous road strand is stored in a geographic database in association with the lane for the roadway.

20 Claims, 14 Drawing Sheets

(56) References Cited

U.S. PATENT DOCUMENTS

| | | | | |
|---|---|---|---|---|
| 2012/0283926 A1* | 11/2012 | Ito | ............... | B60T 8/4018 701/70 |
| 2013/0204515 A1* | 8/2013 | Emura | ............... | G08G 1/0133 701/119 |
| 2013/0282264 A1* | 10/2013 | Bastiaensen | ............... | G08G 1/0129 701/119 |
| 2015/0160024 A1* | 6/2015 | Fowe | ............... | G01C 21/3461 701/400 |
| 2015/0241242 A1* | 8/2015 | Rings | ............... | G01C 21/20 701/465 |
| 2015/0321652 A1* | 11/2015 | Maruyama | ............... | B60T 13/662 60/533 |
| 2016/0086285 A1* | 3/2016 | Peters | ............... | G08G 1/096827 705/4 |
| 2016/0101778 A1* | 4/2016 | Hasberg | ............... | G08G 1/096775 701/96 |
| 2016/0167582 A1* | 6/2016 | Chen | ............... | G01C 21/32 348/148 |
| 2016/0171893 A1* | 6/2016 | Chen | ............... | G01S 15/931 701/300 |
| 2016/0179874 A1* | 6/2016 | Lynch | ............... | G06F 16/2379 707/690 |
| 2016/0258764 A1* | 9/2016 | Phuyal | ............... | G09B 29/007 |
| 2016/0280264 A1* | 9/2016 | Baek | ............... | G06K 9/00818 |
| 2017/0001559 A1* | 1/2017 | Kwon | ............... | B60Q 5/008 |
| 2017/0011465 A1* | 1/2017 | Anastassov | ............... | G06Q 40/08 |
| 2017/0089717 A1* | 3/2017 | White | ............... | G01C 21/3492 |
| 2017/0248431 A1* | 8/2017 | Hofmann | ............... | G01C 21/20 |
| 2017/0309171 A1* | 10/2017 | Zhao | ............... | G01S 19/13 |
| 2017/0314935 A1* | 11/2017 | Vakharia | ............... | G01C 21/32 |
| 2017/0352262 A1* | 12/2017 | Xu | ............... | G08G 1/0112 |
| 2018/0053415 A1* | 2/2018 | Krunic | ............... | G08G 1/0145 |
| 2018/0080773 A1* | 3/2018 | Fowe | ............... | G01C 21/3423 |
| 2018/0100741 A1* | 4/2018 | Phuyal | ............... | G01C 21/26 |
| 2018/0112990 A1* | 4/2018 | Fowe | ............... | G01C 21/3484 |
| 2018/0113880 A1* | 4/2018 | Metcalf-Putnam | ............... | G06F 16/24532 |
| 2018/0122229 A1* | 5/2018 | Mubarek | ............... | G08G 1/096844 |
| 2018/0150764 A1* | 5/2018 | Stenneth | ............... | G06Q 50/30 |
| 2018/0158325 A1* | 6/2018 | Bernhardt | ............... | G01C 21/3415 |
| 2018/0158326 A1* | 6/2018 | Fowe | ............... | G08G 1/0133 |
| 2018/0174443 A1* | 6/2018 | Fowe | ............... | G08G 1/0969 |
| 2018/0174447 A1* | 6/2018 | Pellolio | ............... | G08G 1/0129 |
| 2018/0182238 A1* | 6/2018 | Fowe | ............... | G08G 1/0112 |
| 2018/0218598 A1* | 8/2018 | Aoki | ............... | G08G 1/096716 |
| 2018/0286220 A1* | 10/2018 | Fowe | ............... | G08G 1/0141 |
| 2018/0302484 A1* | 10/2018 | Kothari | ............... | G06F 16/29 |
| 2018/0352376 A1* | 12/2018 | Shuman | ............... | H04W 4/40 |
| 2018/0354486 A1* | 12/2018 | Masuda | ............... | B60T 13/686 |
| 2018/0357890 A1* | 12/2018 | Fowe | ............... | G08G 1/0112 |
| 2018/0374346 A1* | 12/2018 | Fowe | ............... | G08G 1/052 |
| 2020/0292338 A1* | 9/2020 | Fowe | ............... | G08G 1/0133 |

FOREIGN PATENT DOCUMENTS

| | | | |
|---|---|---|---|
| CN | 108921146 A | * 11/2018 | |
| DE | 602004004246 T2 | * 11/2007 | ............ B61K 9/12 |
| DE | 60313736 T2 | * 1/2008 | ............ D04C 1/06 |
| EP | 3064901 A1 | * 9/2016 | ............ G01C 21/32 |
| JP | 2014153236 A | * 8/2014 | ............ G09B 29/106 |
| JP | WO2014061136 A1 | * 9/2016 | ............ G08G 1/015 |
| WO | WO-2015198156 A1 | * 12/2015 | ............ G08G 1/056 |
| WO | WO-2016098361 A | * 6/2016 | ............ H04L 67/00 |

* cited by examiner

//cdn-uploads.huggingface.co/production/uploads/688de79cf0398b01ca40ecad/Ri1v2MvZlw8hqkQKd8Xvu.png
DANGEROUS LANE STRANDS

FIELD

The following disclosure relates to the identification of dangerous roadway conditions, and more specifically, to the calculation of dangerous conditions on individual lanes of a roadway.

BACKGROUND

Map databases or geographic databases are used in computer based systems that provide useful features to users. For example, the identification of routes to destinations or points of interests. A navigation system determines the optimum route to be taken by the end user to travel from the origin to the destination location from map data stored in a map database. Similarly, the navigation system may query the map database for nearby points of interest.

The map database may be changed as permanent changes are made to the roadways. As new roads are built, other roads are closed, or locations of business are changed, the corresponding changes are made to the map database. Other road conditions may be transient. These transient changes may impact the time for traveling a particular route, which impacts the determination of the optimum route from the origin to the destination location. For example, dangerous driving conditions in roadways which may affect vehicles and vehicle operators as the roadways are traveled. These dangerous driving conditions may cause or result in events impacting specific vehicles on the roadway.

SUMMARY

In one embodiment, a method for calculation of a dangerous road strand of a roadway includes identifying probe data for a roadway having a plurality of lanes, selecting a subset of the probe data for a predetermined lane of the plurality of lanes, calculating values for a change in velocity for multiple sequences in the subset of the probe data, clustering values for the change in velocity based on a danger value, identifying the dangerous road strand from the clustered values, and storing the dangerous road strand in a geographic database in association with the predetermined lane for the roadway.

In another embodiment, an apparatus for calculation of map data including at least one dangerous road strand of a roadway includes a road network module, a speed comparison module, a clustering module, and a road strand module. The road network module is configured to identify probe data for a roadway having a plurality of lanes and select a subset of the probe data for a predetermined lane of the plurality of lanes. The speed comparison module is configured to calculate values for a change in velocity for multiple sequences in the subset of the probe data. The clustering module is configured to cluster values for the change in velocity based on a sudden braking value. The road strand module is configured to identify the dangerous road strand from the clustered values.

In another embodiment, a non-transitory computer readable medium including instructions that when executed by a processor are configured to perform identifying probe data for a roadway having a plurality of lanes, clustering values for a change in velocity based on the probe data, identifying a lane for the plurality of lanes for a dangerous road strand from the clustered values, and storing the dangerous road strand in a geographic database in association with the identified lane for the roadway.

BRIEF DESCRIPTION OF THE DRAWINGS

Exemplary embodiments of the present invention are described herein with reference to the following drawings.

DETAILED DESCRIPTION

The following embodiments include navigation systems and other location based services that process probe data including a calculation related to how safely vehicles are able to navigate individual road lanes, as well as, a calculation to quantify which lanes are more dangerous compared to others or a baseline safety level. When one lane is determined to be more dangerous than adjacent lanes of the roadway, navigation systems may issue instructions (e.g., stay left, change lanes) to avoid the dangerous lane. Similarly, anonymous or assisted driving vehicles may avoid dangerous lanes or select the safest lanes based on attributes of the roadway such as through a sharp curve.

For these embodiments, high granularity between lanes and along lanes that defines where the dangerous conditions begin and end. High precision navigation is provided to vehicles by high definition maps for navigation, and it is important to provide information in the map that has high granularity and precision. This will help reduce driving errors and accidents.

The following embodiments solve these problems by using probe data (e.g., historical probe data or real time probe data) analytics to elicit on the map, lanes where drivers usually find challenging to drive or navigate at different times of the day. These locations may be indicated or otherwise stored in the map. The locations may be limited to specific lanes and at specific times of the day or days of the week.

The following embodiments relate to several technological fields including but not limited to navigation, autonomous driving, assisted driving, traffic applications, and other location-based systems. The following embodiments achieve advantages in each of these technologies because an increase in the accuracy of the identification of dangerous conditions improves the effectiveness, efficiency, and speed of specific application in these technologies. In each of the technologies of navigation, autonomous driving, assisted driving, traffic applications, and other location-based systems, improved identification of dangerous conditions at a lane level improves the technical performance of the application. In addition, users of navigation, autonomous driving, assisted driving, traffic applications, and other location-based systems are more willing to adopt these systems given the technological advances in lane level detection of dangerous conditions.

In addition, this methodology helps to increase the probability that drivers choose the safest lanes. This is even more important in developing markets where there are fewer alternative routes and many of the roads are bad and the dangers of the bad roads too are time and weather dependent, i.e. a port-hole on the road is more dangerous at night or in rain than during the day in dry weather.

Figure 1:
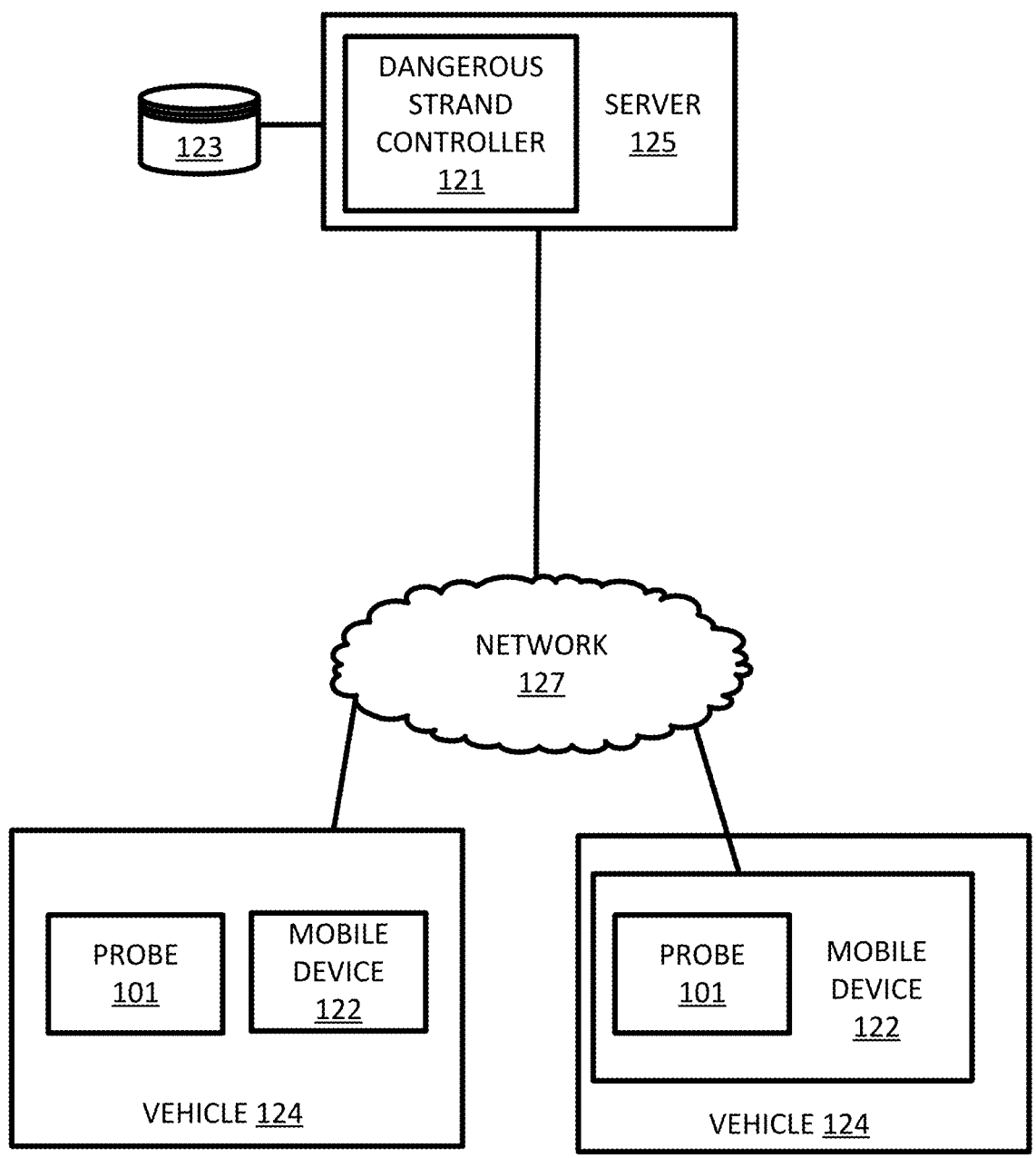
FIG. 1 illustrates an example system for dangerous lane strand detection.

FIG. 1 illustrates an example system for lane level detection of dangerous conditions. The system includes a server 125 including a dangerous strand controller 121, a mobile device 122, and a network 127. A map developer system may include the server 125 and a database 123. The developer system may include computer systems and networks of a navigation system operator. The mobile device 122, or multiple mobile devices, collects the probe data and the server 125 performs the following algorithms on the probe data. The vehicles 124 may be directly connected to the server 125 or through an associated mobile device 122. The server 125 and the geographic database 123, exchanges (e.g., receives and sends) data from the vehicles 124. Additional, different, or fewer components may be included.

Each vehicle 124 and/or mobile device 122 may include position circuitry (e.g., probe 101) such as one or more processors or circuits for generating probe data. The probe data may be generated by receiving GNSS signals and comparing the GNSS signals to a clock to determine the absolute or relative position of the vehicle 124 and/or mobile device 122. The probe data may be generated by receiving radio signals or wireless signals (e.g., cellular signals, the family of protocols known as WiFi or IEEE 802.11, the family of protocols known as Bluetooth, or another protocol) and comparing the signals to a pre-stored pattern of signals (e.g., radio map). The mobile device 122 may act as probe 101 for determining the position or the mobile device 122 and the probe 101 may be separate devices.

The probe data may include a geographic location such as a longitude value and a latitude value. In addition, the probe data may include a height or altitude. The probe data may be collected over time and include timestamps. In some examples, the probe data is collected at a predetermined time interval (e.g., every second, ever 100 milliseconds, or another interval). The probe data may also describe the speed, or velocity, of the mobile device 122. The speed may be determined from the changes of position over a time span calculated from the difference in respective timestamps. The time span may be the predetermined time interval, that is, sequential probe data may be used. The term probe data may also be used to describe the speed data.

In some examples, the probe data is collected in response to movement by the probe 101 (i.e., the probe reports location information when the probe 101 moves a threshold distance). The predetermined time interval for generating the probe data may be specified by an application or by the user. The interval for providing the probe data from the mobile device 122 to the server 125 may be may the same or different than the interval for collecting the probe data. The interval may be specified by an application or by the user.

The dangerous strand controller 121 identifies dangerous conditions on individual lanes of a roadway. The dangerous conditions are identified from the probe data (e.g., speed) collected from the mobile devices 122. The probe data may be historic data collected by one or more mobile devices 122 over a time period, stored in a database, and subsequently analyzed. The probe data may be real time data that is collected and analyzed at substantially the same time or based on a continuous data feed. The probe data may be associated with individual lanes of the roadway. The roadway may be a multi-lane roadway have multiple lanes traveling in the same direction. A lane of the roadway is a section of the roadway designed for a single line of vehicles. The lanes of a roadway are arranged in a direction perpendicular to the direction of travel on the roadway. The lanes of the roadway may be divided by one or more lines.

The probe data may be filtered into different lanes using one or more of a variety of techniques. The probe data is collected at a high enough spatial resolution by the GNSS to distinguish between lanes of the roadway. The dangerous strand controller 121 may identify the locations of the lanes through clustering the GNSS position. The number of clusters corresponds to the number of lanes, and the default lane size is centered around the lane clusters.

Alternatively, the dangerous strand controller 121 retrieves stored lane positions such as the boundaries for the lanes from memory or the geographic database 123. The dangerous strand controller 121 compares the location data from the probe data to the stored lane positions.

In another example, the lanes may distinguished through another type of positioning. For example, the dangerous strand controller 121 may analyze image data from a camera or distance data from a distancing system such as light detection and ranging (LiDAR). The dangerous strand controller 121 access a fingerprint or other template to compare with the image data or the distance data. Based on the comparison, the dangerous strand controller 121 determines the location of the mobile device 122, and based on the boundaries of the lanes, determines the lane of travel of the mobile device 122.

In another example, the dangerous strand controller 121 detects lane lines. The lane lines may be detected from the camera data or distance data. Images of the road surface may be analyzed by the dangerous strand controller 121 to identify patterns corresponding to lane lines that mark the edges of the lanes. Similarly, distance data such as LiDAR may include the location of lane markers.

In another example, the dangerous strand controller 121 performs triangulation to determine the lane of travel of the mobile device 122. Triangulation may involve comparison of the angle, signal strength, or other characteristics of wireless radio signals received from one or more other devices. The positioning may be based on a received signal strength indicator (RSSI) measured at the mobile device 122. The RSSI may decrease proportionally to the square of the distance from the source of the signal. The positioning technique may analyze cellular signals received from multiple towers or cells. Position may be calculated from triangulation of the cellular signals. Several positioning techniques may be specialized for indoor applications such as pseudolites (GPS-like short range beacons), ultra-sound positioning, Bluetooth Low Energy (BTLE) signals (e.g. High-Accuracy Indoor Positioning, HAIP) and WiFi-Fingerprinting.

The mobile device 122 may include mapping applications, navigational applications, or driving applications, which utilize the predicted traffic levels. Mapping applications may include a traffic map in which the dangerous condition levels are illustrated for different roadways. The dangerous condition levels may be presented using colors coded for different traffic levels. Other traffic indicators may be used. The navigational applications may present routes (e.g., turn-by-turn directions) that are calculated according to the predicted traffic levels. The predicted time levels are converted to predicted travel times that are used to compare potential routes. The driving applications may provide driving warnings or commands in response to the predicted traffic levels. For lane-level traffic levels, the driving applications may instruct the driver or vehicle to change lanes.

The mobile devices 122 may include local databases corresponding to a local map, which may be modified by to the server 125 using the geographic database 123. The local map may include a subset of the geographic database 123 and is updated or changed as the vehicles 124 travel. The mobile devices 122 may be standalone devices such as smartphones or devices integrated with vehicles. In some embodiments the local maps are modified according to data collected by the mobile device 122 or vehicle 124. In other embodiments, the collected data is transferred to the server 125 for augmenting the geographic database 123.

Communication between the vehicles 124 and/or between the mobile device 122 and the server 125 through the network 127 may use a variety of types of wireless networks. Example wireless networks include cellular networks, the family of protocols known as WiFi or IEEE 802.11, the family of protocols known as Bluetooth, or another protocol. The cellular technologies may be analog advanced mobile phone system (AMPS), the global system for mobile communication (GSM), third generation partnership project (3GPP), code division multiple access (CDMA), personal handy-phone system (PHS), and 4G or long term evolution (LTE) standards, 5G, DSRC (dedicated short range communication), or another protocol.

Figure 2:
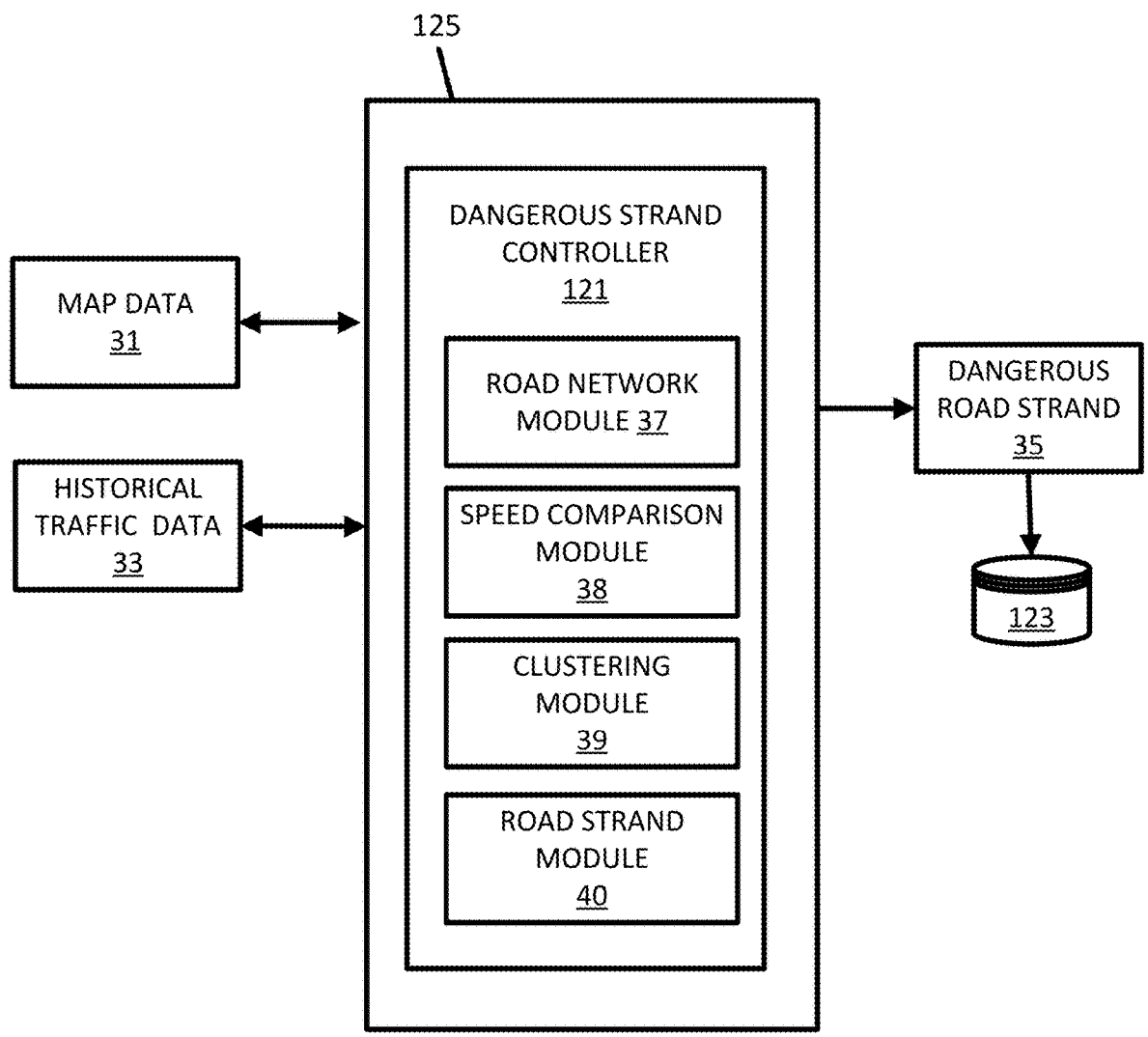
FIG. 2 illustrates an example framework for the dangerous strand controller of the system of FIG. 1.

FIG. 2 illustrates an example framework for the dangerous strand controller 121 of the system of FIG. 1. The dangerous strand controller 121 includes any combination of a road network module 37, a speed selection module 38, a clustering module 39, and a road strand module 40. Additional, different, or fewer components may be included.

The road network module 37 is configured to identify sections of road that are analyzed for safety. A described in more detail herein, poor safety or a dangerous condition may be inferred from rapid or sudden changes in speed. Different changes in speed may correspond to different levels of dangers. The road network module 37 may calculate deceleration for a lane of a roadway between two points, with a first point upstream of a second point, as a difference between the initial velocity (velocity at the first point) and the final velocity (velocity at the second point). The road network module 37 may scale the deceleration in time by dividing by a time interval. The road network module 37 may calculate deceleration or average deceleration (AD) according to Equation 1:

$$AD=(\text{final-velocity}-\text{initial-velocity})\div \text{time} \qquad \text{Eq. 1}$$

The road network module 37 may calculate a danger value or sudden braking value based on the deceleration or changes in speed. The road network module 37 may calculate the danger value based on a proportion of sudden braking or deceleration measurements that are collected out of the total probes or trajectories along the section of the lane of the roadway. The road network module 37 may calculate a danger value or a sudden braking metric according to Equation 2:

$$DV=|AD|*F\div Q \qquad \text{Eq. 2}$$

The average deceleration (AD) may be calculated from Equation 1 or another technique for determining the change in velocity over a predetermined time interval or distance interval. The frequency (F) is a number of clustered measurements indicative of sudden deceleration or braking are collected. A trajectory quantity (Q) is a number of total probes in the section of the lane of the roadway such as during the predetermined time interval and/or predetermined distance interval. In other examples, a sudden braking value may be based only on the change in velocity while the danger value considers other factors such as the frequency of measurements and/or quantity of trajectories.

The road network module 37 may analyze the roads in a variety of other techniques. The road network module 37 is configured to identify probe data or probe data for a roadway having multiple lanes. The probe data may be the absolution location or relative location data collected by the GNSS system. The speed data may be calculated from subtraction of sequential probe data.

One technique, which may be referred to as a sliding window approach, applies a sliding window to the probe data (location data or speed data). The road network module 37 selects a sliding window for the subset of the probe data having a time span and a predetermined lane. The speed selection module 38 analyzes the probe data in the sliding window, increments the sliding window, and the process repeats. The speed selection module 38 calculates values for a change in velocity for the sliding window. In one example, the last value of the sliding window is subtracted from the first value of the sliding window. In other examples, because the sliding window includes more than two values, the speed selection module 38 may subtract adjacent values from each other to determine speed change data. The speed change data is averaged over the sliding window. Alternatively, the largest speed change data, or the largest predetermined speed change data, is selected to represent the speed change data.

The sliding window may be incremented according to a time interval. In one example, the sliding window is incremented such that a current position of the sliding window overlaps the prior position of the sliding window. In this way, a particular value for the probe data may be used in multiple sliding windows.

Figure 3:
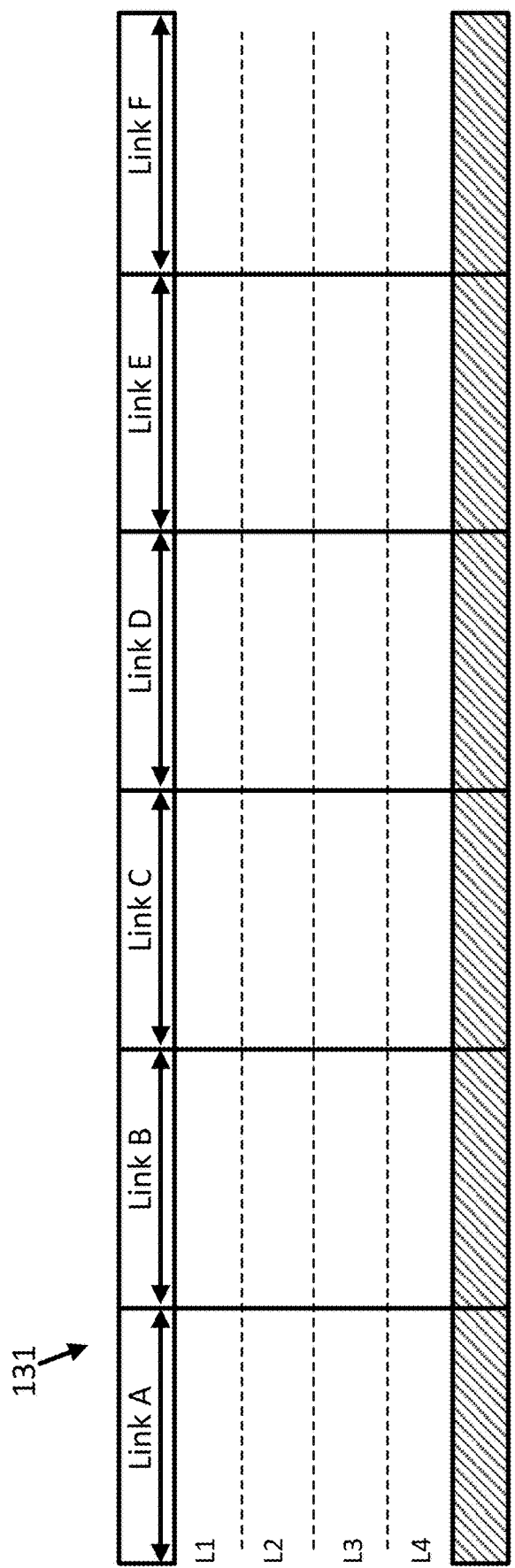
FIG. 3 illustrates an example road network including a multi-lane road.

FIGS. 3-7 illustrate another technique, which may be referred to a sequential segment approach. In FIG. 3, a roadway 131 is illustrated in road segments or links (e.g., link A, link B, link C, link D, link E, link F) having multiple lanes (e.g., lane 1, lane 2, lane 3, lane 4). The roadway 131 is associated with probe data divided into sequential segments that do not overlap. The sequential segments are subsets of probe data for a particular lane of the roadway. For each sequential segment, the speed change data is calculated as the difference in the highest speed and the lowest speed. The speed selection module 38 calculate values for the change in speed for multiple sequences in the subset of probe data. While the term speed may be used herein, the speed may be a velocity associated with a direction.

Figure 4:
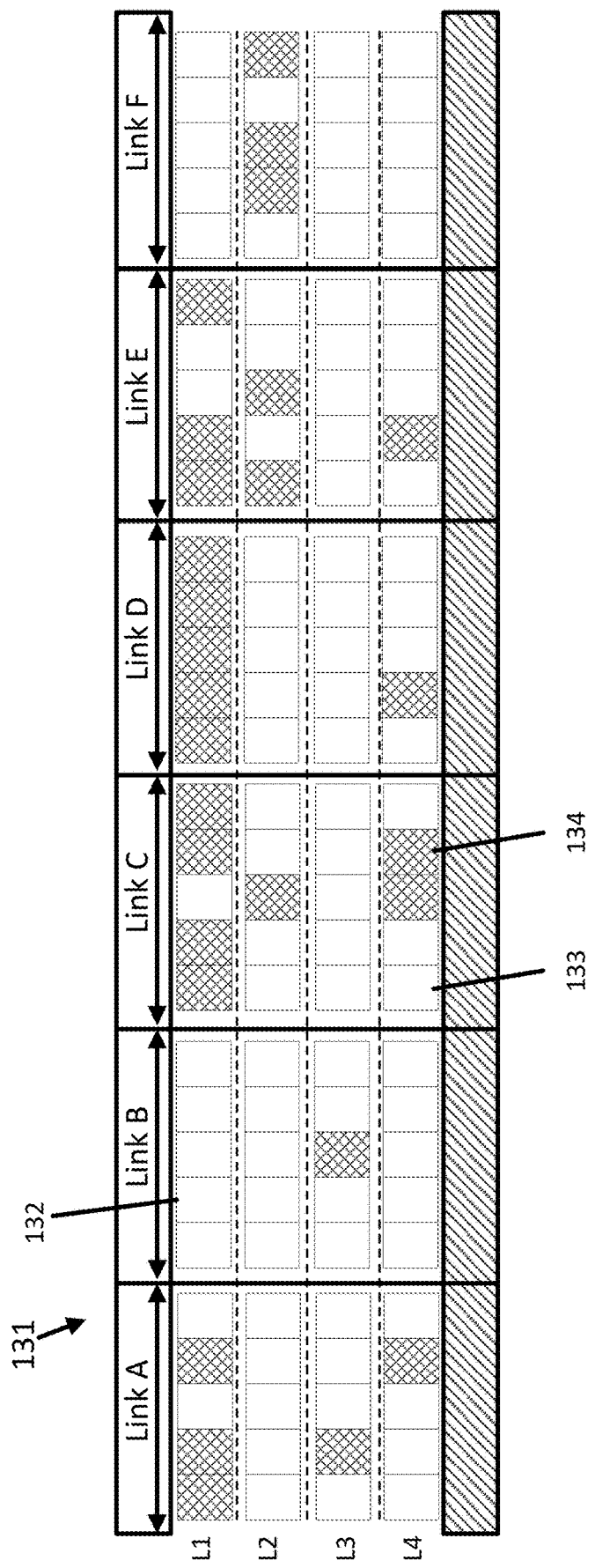
FIG. 4 illustrates the multi-lane road with indicators for speed changes.

FIG. 4 illustrates an example for clustering the speed change data, derived from the probe data, for the roadway 131. For the purpose of illustration, each lane of each road segment or link is illustrated with a grid 132 of five cells.

The grid may represent observation of different vehicles that have traveled the particular lane of the roadway 131. In one example, the cells of the grid 132 represent different intervals of time or epochs for vehicles that have traveled the particular lane of the roadway 131. In another example, the cells of the grid 132 represent a quantity of vehicles that have traveled the particular lane of the roadway 131.

For each grid 132, each cell may have either a first value or a second value. The first value, represented by open or non-shaded region 133, may indicate the absence of significant speed changes or dangerous conditions. The second value, represented by a checked or shaded region 134, may indicate significant speed changes or dangerous conditions.

The clustering module 39 is configured to cluster values for the change in speed. In one example, the clustering module 39 may compare location data in the multiple sequences from the probe data to group the location data according to location. In addition, the clustering module 39 may compare danger values for the sequences of the probe data to group the data according to similar danger values or danger values greater than a threshold. For data points grouped by location and danger value, the clustering module 39 identifies at least one cluster. The identified cluster may occur at the time and location where the location data falls within a predetermined range and the danger values fall within a predetermined range.

Initially, the clustering module 39 may filter the speed change values from the grids 132 in order to remove outliers. The clustering module 39 may filter the speed change values according to the organization of the grids 132. For example, each cell of the grid 132 may be designated high or filled when a predetermined occupancy or a predetermined number of instances (e.g., observations or vehicles) associated with the cell indicate the speed change condition The clustering module 39 may compare occupancy of each of the grids 132 to the predetermined occupancy. Grids that have equal or more than the predetermined occupancy proceed to the clustering algorithm. Grids that do not have equal or more than the predetermined occupancy are discarded, deleted, or otherwise removed from the clustering algorithm.

Figure 5:
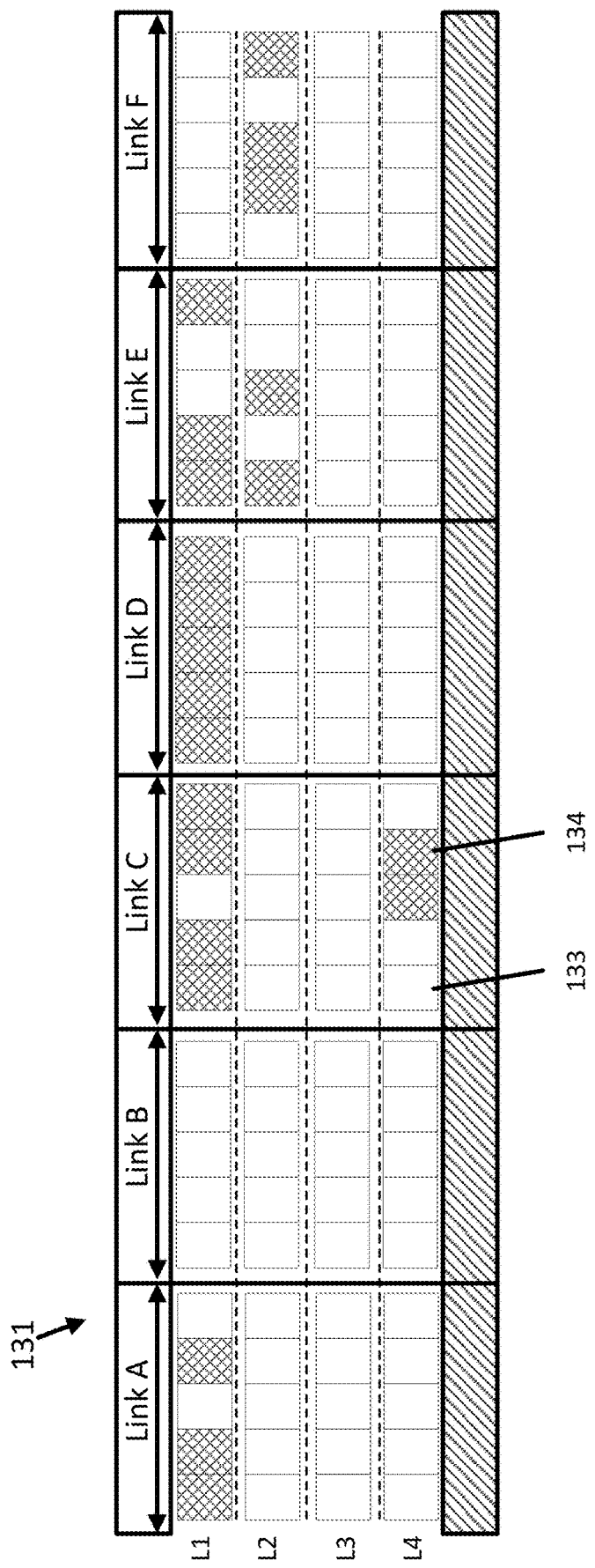
FIG. 5 illustrates the multi-lane road with clusters of the indicators of FIG. 5.

A comparison of FIGS. 4 and 5 illustrates the removal of grids or cells having less than the predetermined occupancy. For example, in FIG. 4 several grids 132 have only one cell in the occupied state 134. With an example predetermined occupancy of 2, in FIG. 5, the clustering module 39 has removed those grids 132 (e.g., deleted from memory).

The cluster module 39 proceeds with the clustering algorithm. In the clustering algorithm, grids, having equal to or greater the predetermined occupancy level, are compared in quantity and/or geography to identify a cluster of grids 132. In some cases, a density-based clustering method may be applied to the location data. For example, the density-based spatial clustering of applications with noise (DBSCAN) clustering method may be used. Alternatively, a hierarchical density clustering method such as HDBSCAN may be used. For DBSCAN, a first location data point of the projected location data 313 may be a core point if a minimum number of other location points are within a predetermined distance (e.g. a "neighborhood") of the core point. Every location data point in the neighborhood of the first point are directly reachable from the first point. A second location data point may be a reachable point if a path may be constructed from the second point to the first point using only other points that are directly reachable from the first point (e.g. all the location data points on the path are core points). A point may be an outlier point if it is not reachable from any other points. By changing the value of cluster criteria such as the distance of the neighborhood and the minimum number of other location points required to define a core point, different arrangements, and numbers of clusters may be formed from the same projected location data.

Figure 6:
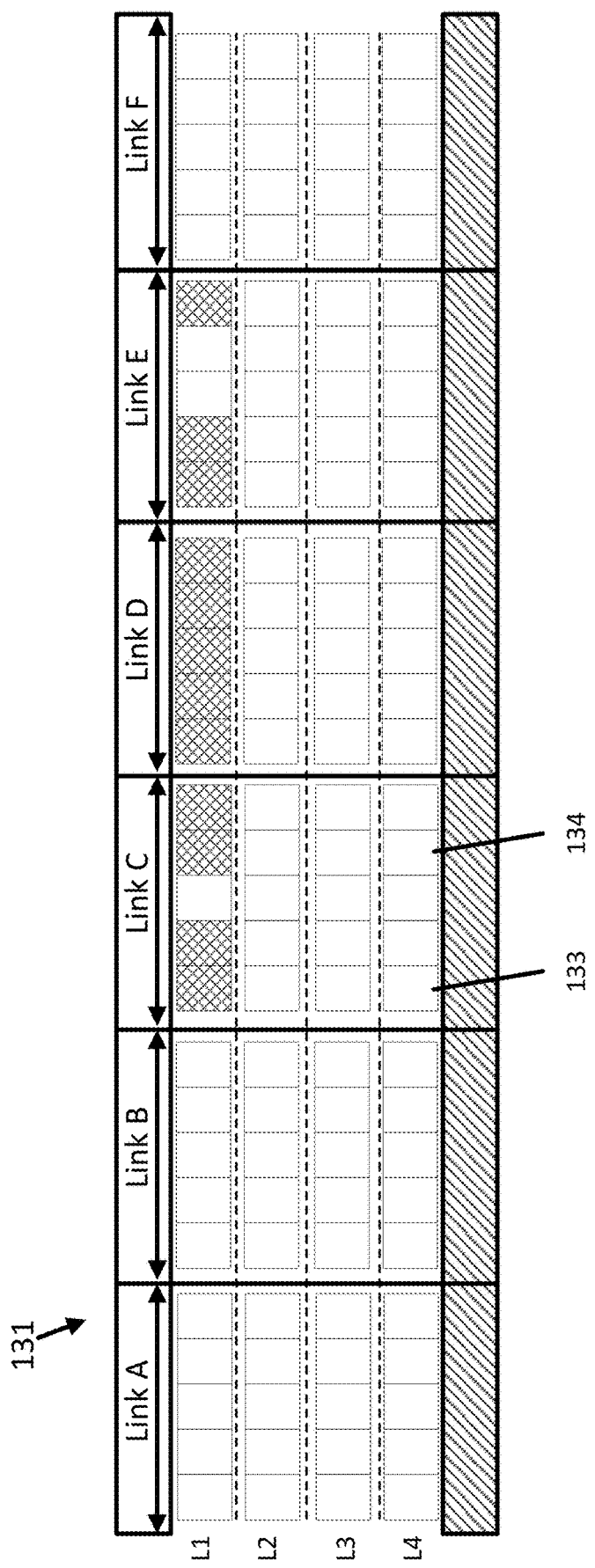
FIG. 6 illustrates the multi-lane road with clusters of the indicators of FIG. 5.
Figure 7:
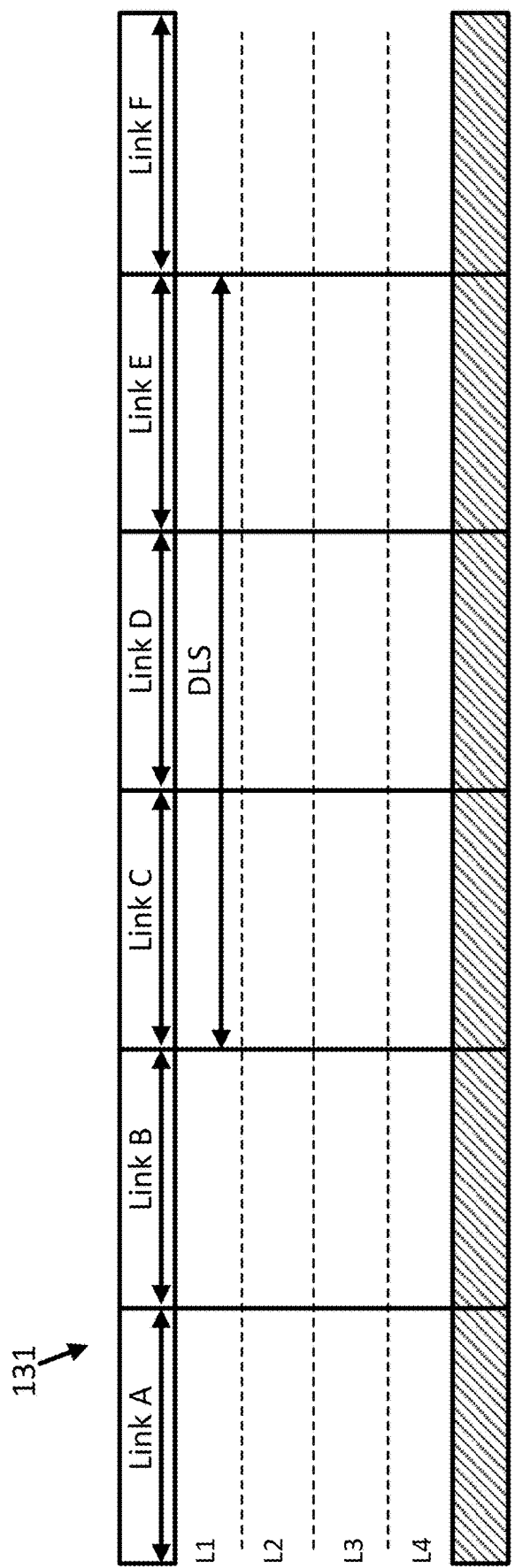
FIG. 7 illustrates the multi-lane road with dangerous lane strands from the clusters of FIG. 6.

Comparing FIGS. 5 and 6, some of the grids 132 analyzed by the clustering module 39 are clustered together and some of the grids 132 are removed from the process (e.g., deleted from memory). The clustering algorithm may be set so that grids 132 are clustered together when they meet the occupancy requirements described earlier and also meet a distance requirement and a road network requirement.

With regards to the road network requirement, the clustering algorithm may be set so that only grids in the same lane are clustered together. Alternatively, the clustering algorithm may be set so that grids in the same lane or lanes that are downstream or upstream of the lane. That is, one or more road links after or before an intersection may be grouped together with a particular lane may be clustered with the particular lane.

With regards to the distance requirement, the clustering algorithm may be set so that only grids within a threshold distance are clustered together. The distance requirement may be that adjacent road segments only may be clustered together. That is, a cluster is a continuous chain of road segments.

FIG. 6 illustrates the clustered road segments, which include Road Links C, D, E and for Lane L1. The road strand module 40 is configured to identify the dangerous lane strand (DLS) from the clustered values. That is, the continuous chain of road segments determined from the clustering algorithm is designated as a DLS.

In some embodiments, before the probe data is clustered, the probe data may be filtered according to one or more external factors, or external measurements, that were measured when the probe data was collected. In some instances, the external factors may impact the change in speed data due to physical limitations, and in other instances, the external factors may impact the perceptions of drivers, which indirectly affects the change in speed.

Examples of the external factors may include weather, time, weather related road conditions, or other transient road conditions. Types of weather include rain, snow, sunshine, hail, sleet, temperature or other examples. Weather related road conditions may include wet roads, snow on the roads, ice on the roads, or other examples. The time may be time of day, day of the week, day of the year or other examples. Other transient road conditions may include stalled vehicles, objects on the road, or other examples.

The dangerous strand controller 121 may filter the probe data according to the external factors. The dangerous strand controller 121 may generate a first set of probe data having a first external factor and a second set of probe data having a second external factor.

Table 1 describes a database including example lane strands. Each lane strand may be associated with any combination of a strand identifier, a sequence of segments, a length, a lane value, and a road type.

TABLE 1

| Strand | Segments | Length (KM) | Lane | Road-type |
| --- | --- | --- | --- | --- |
| <string> Strand-ID | <string> {Link1, Link2, Link3, . . . , LinkN} | <float> | <integer> | <string> |

TABLE 1-continued

| Strand | Segments | Length (KM) | Lane | Road-type |
|---|---|---|---|---|
| <string> Strand-ID | <string> {Link1, Link2, Link3, ..., LinkN} | <float> | <integer> | <string> |

The sequence of segments may be the road links or segments that make up the strand. The segments may be listed with link numbers (e.g., Link1, Link2, etc.) or segment identifiers having a sequence of 8 or 16 alphanumeric characters.

The strand identifier may be an alphanumeric sequence that identifies the strand. The strand identifier may be derived from the sequence of segment or link identifiers. For example, segment identifiers may be concatenated to form the strand identifier. The strand identifier may include a value for the number of segments, the identity of the roadway, or the designated lane or lanes.

Some of these values may be included in separate quantities in the table. The length may represent the spatial distance (e.g., in kilometers or meters) of the strand. The lane value may represent a lane or lanes include in the strand. The lane value may be a first lane, a second lane, a left lane, a center-right lane, or other values. The road type may describe the functional classification or other type of the roadway.

Table 2 describes a database including example dangerous lane strands. Each lane strand may be associated with any combination of a strand identifier, a time epoch, weather value, a sudden braking (SB) metric, and a recommended speed.

TABLE 2

| Strand | Time-epoch | Weather | SB-Metric | Recommended-Speed |
|---|---|---|---|---|
| <string> Strand-ID | <timestamp> | <json> {temp, rain, snow} | <float> | <float> |
| <string> Strand-ID | <timestamp> | <json> {temp, rain, snow} | <float> | <float> |

The strand identifier may be a unique code that identifies the DLS. The strand identifier may be provided incrementally or the strand identifier may be derived from one or more of the following components of the strand, including the time epoch, the weather value, the SB metric, or the recommended speed.

The time epoch may be a time period used to identify the DLS. The time period may be a time of day, day of week or day of the year. The time epoch may be determined by holidays or business hours. The time epoch may have various duration such as 1 minute, 15 minutes, 1 hour, or another value.

The weather value may indicate a type of weather occurring for the identification of the DLS. Example types of weather include rain, snow, and temperature. The weather value may indicate the intensity or the weather.

The sudden braking (SB) metric may be a value that indicates the sudden braking values calculated from Equation 2 herein. Other metrics may be used. The SB metric may be a running average that is modified over time. The SB metric may be received from another entity. The SB metric may be replaced with another metric based on observations of the vehicles 124 or mobile devices 122. That is, rather than indicate when the vehicle brakes, the metric may be derived from detection of obstacles or other vehicles in a predetermined area around the vehicle. The predetermined area may have a variable shape dependent on the speed of the vehicle (e.g., higher speed corresponds to larger area) or a characteristic of the road (e.g., higher functional classification corresponds to larger area). The recommended speed may be determined according to the DLS. For example, higher danger values or SB metrics may correspond to a lower recommended speed.

Figure 8:
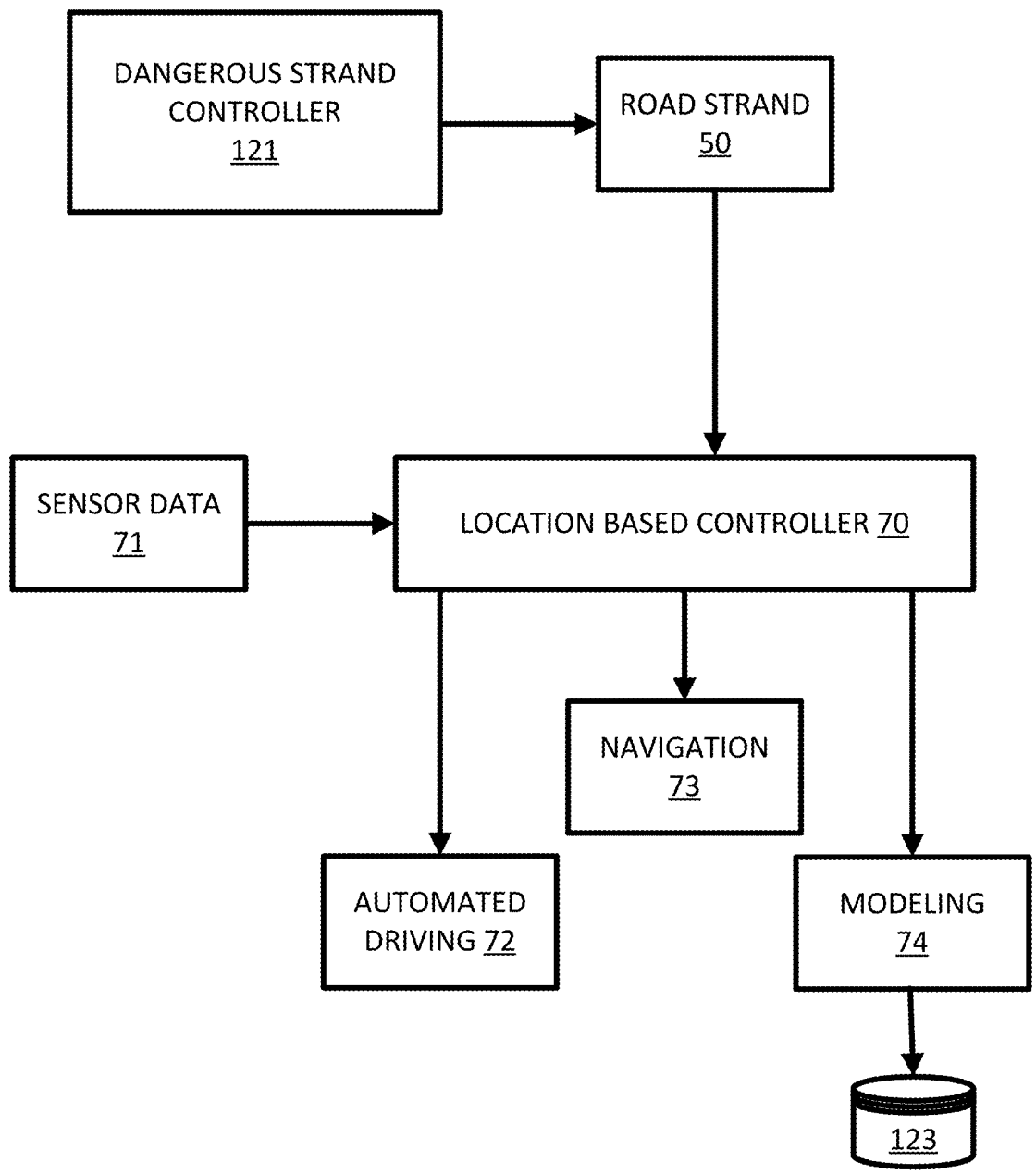
FIG. 8 illustrates a system for providing location based services in response to the dangerous lane strands.

FIG. 8 illustrates a system for providing location based services in response to the dangerous lane strands. The dangerous strand controller 121 may provide DLS data by coordinates, segment identifiers, or the DLS identifiers described herein to an external device such as a location based controller 70. The location based controller 70 may collect sensor data 71 from one or more other sources. Based on the combination of the sensor data 71 and the object coordinates, the location based controller 70 provides automated driving 72, navigation 73, and/or modeling 74. The location based controller 70 may include a communication interface or device configured to provide data for the road strand 50 to an external device to provide automated driving 72, navigation 73, and/or modeling 74. Additional, different, or fewer combinations may be included.

The dangerous strand controller 121, or the location based controller 70, may calculate a route from an origin to a destination. The route may be modified in response to the road strand data 50. When the route includes a dangerous location, the route may be modified to avoid the dangerous location. The dangerous strand controller 121, or location based controller 70, may assign a cost to the dangerous road strand or a lane associated with the dangerous road strand. The cost may be a numerical value used to compare different routes, including different lanes, between the origin in the destination. The cost from the dangerous road strand may be combined with other costs such as that derived from speed limits, traffic, curvature, or other costs. That is, possible routes may be compared using a summation of costs for the road segments making up the routes. The lowest cost route may be selected as the route. Due to the cost assigned to the dangerous road strand, the lane including the dangerous condition may be avoided.

For automated driving, the location based controller 70 may generate a driving command in response to the road strand 50 or dangerous location. In one example, the driving command may instruct the vehicle to change lanes according to the road strand 50. For navigation, the location based controller 70 may generate one or more navigation instructions in response to the road strand 50 or dangerous location. The location based controller 70 may generate a warning in response to the road strand 50. The warning may be provided via mobile device 122 or vehicle 124 to a driver. The warning may instruct the driver to changes lanes or avoid a roadway. The mobile device 122 or vehicle 124 may include an annunciator configured to provide the warning in response to the road strand 50. The annunciator may include a speaker or a display for conveying the warning.

For modeling, the location based controller 70 may generate a three-dimensional model in response to the road strand 50 or dangerous location. The three-dimensional model may represent the lanes of the roadway and one or more indication for the dangerous location. For example, the three-dimensional model may depict multiple lanes including indicia for at least one lane that includes the dangerous location. The dangerous location may be highlighted with a symbol or color. The three-dimensional model may include a narrow or other instruction to avoid the dangerous location.

For modeling, the location based controller 70 may generate a map that includes the dangerous location in response on the road strand 50 or the dangerous location. The location based controller 70, or the dangerous strand controller 121 may store the map in the geographic database 123. In some instances, the road strand 50 may be associated with a particular road segment or lane of a road segment in the map. The map may include a first designation for the identified dangerous road strand and a second designation for another portion of the roadway. The first designation and the second designation are different colors for the area of the lane, different outlines for the lanes, text labels, or other indicia.

Figure 9:
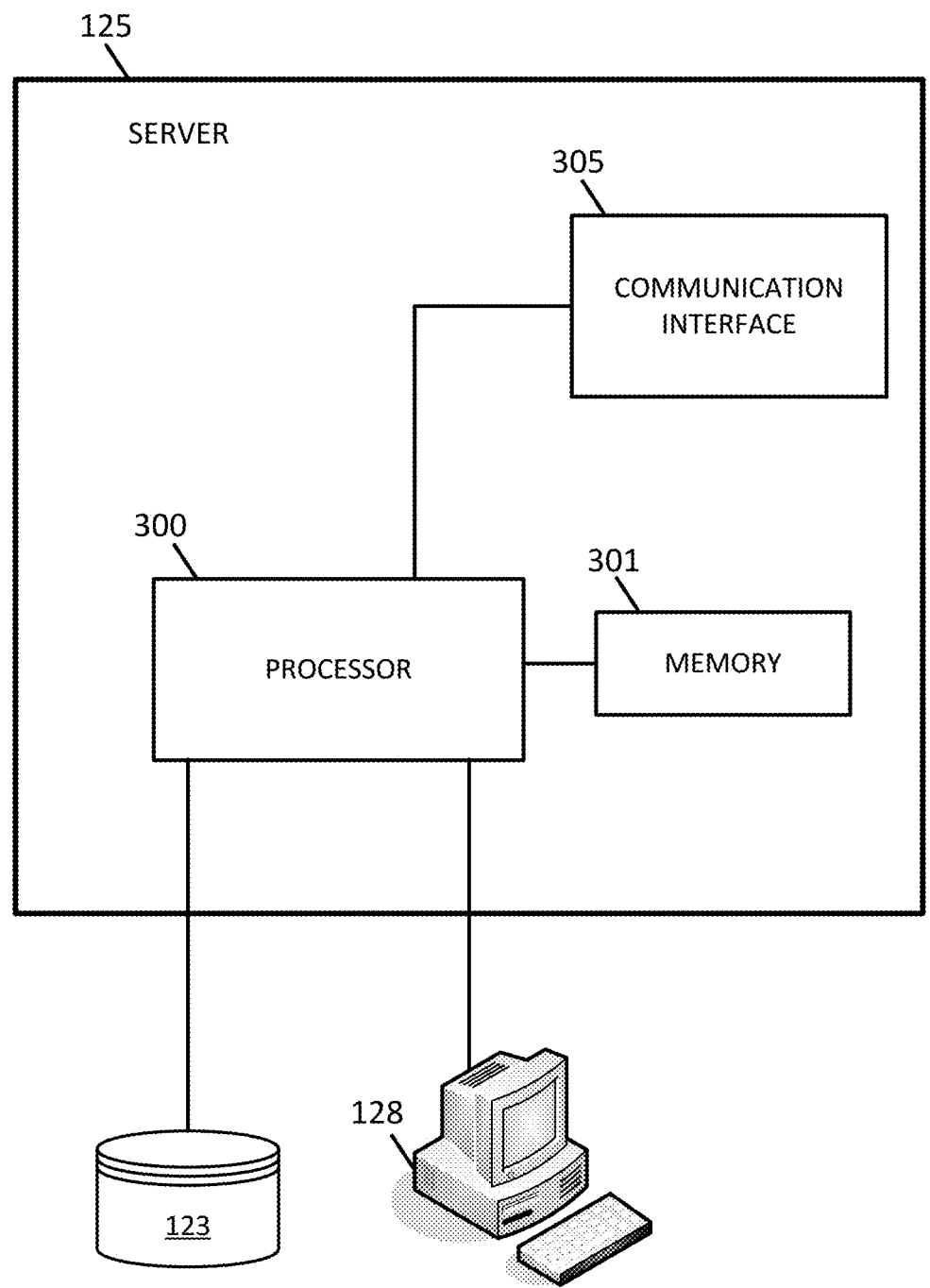
FIG. 9 illustrates an example server implementation of the dangerous strand controller.

FIG. 9 illustrates an example server implementation of the dangerous strand controller. FIG. 9 illustrates an example server 125, which may apply to the system of FIG. 1. The server 125 includes a processor 300, a communication interface 305, a memory 301, and a database 123. An input device (e.g., keyboard or personal computer 128) may be used to enter settings to the server 125. The settings may include settings for thresholds and other user preferences described herein. Additional, different, or fewer components may be provided in the server 125.

Figure 10:
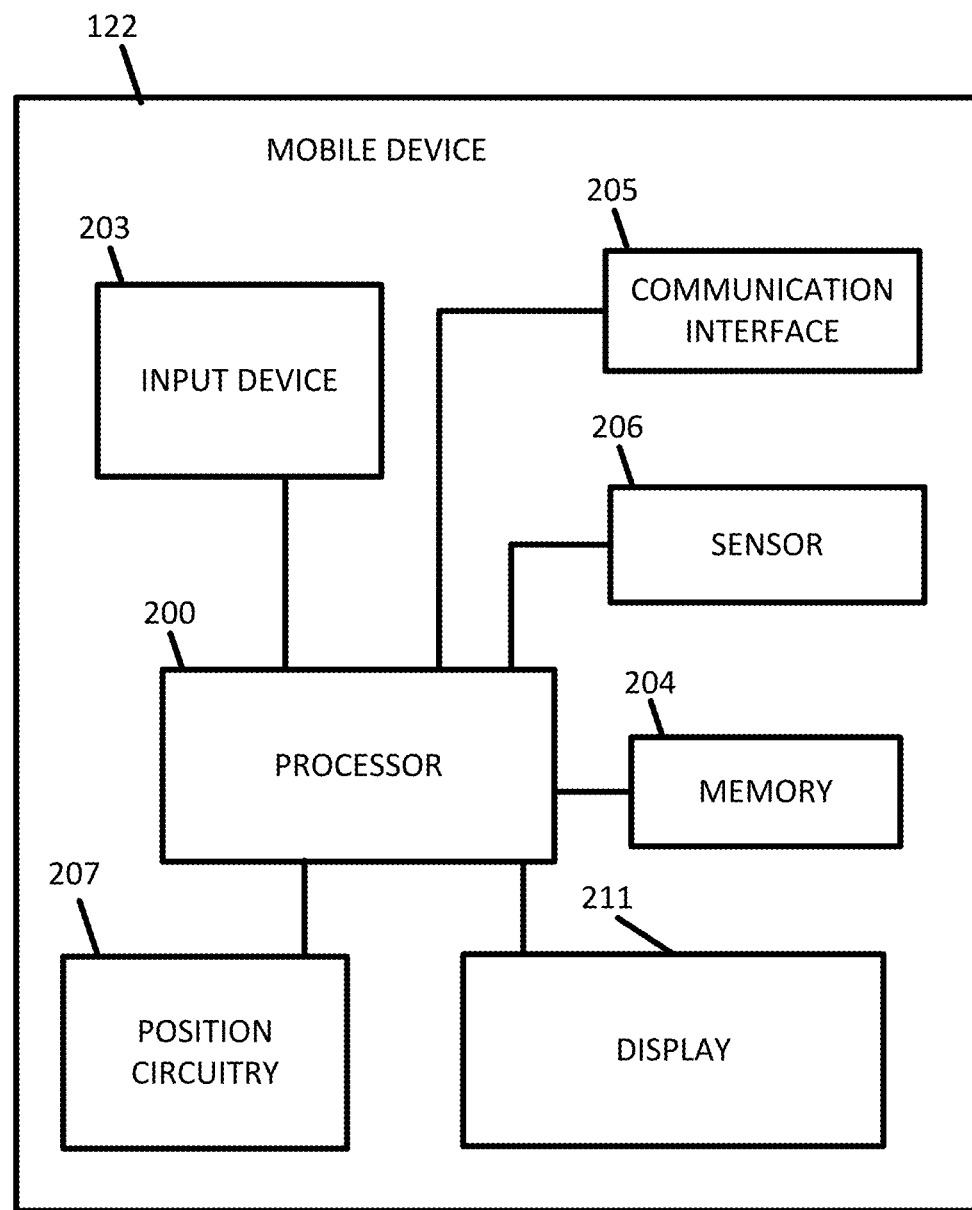
FIG. 10 illustrates an example mobile device implementation of the dangerous strand controller.

FIG. 10 illustrates an example mobile device implementation of the dangerous strand controller 121. FIG. 15 illustrates an exemplary mobile device 122 of the system of FIG. 1. The mobile device 122 includes a processor 200, a memory 204, an input device 203, a communication interface 205, position circuitry 207, a display 211, and a sensor 206. The input device 203 may receive commands from the user for default settings for the lane level stand determinations including thresholds for the sudden braking metric, minimums for the number of observations, values for the time window for determining deceleration, and/or other values. The default settings may include the number or types of lanes that are analyzed, the ranges for the warnings provided to the driver or vehicle.

The processor 200 may communicate with a vehicle ECU which operates one or more driving mechanisms (e.g., accelerator, brakes, steering device). Alternatively, the mobile device 122 may be the vehicle ECU, which operates the one or more driving mechanisms directly. The sensor 206 may include a camera, a LiDAR device, or another sensor described herein. The sensor 206 may detect congestion local to the mobile device 122. The sensor 206 may detect when an intersection is approaching. Additional, different, or fewer components are possible for the mobile device 122.

Figure 11:
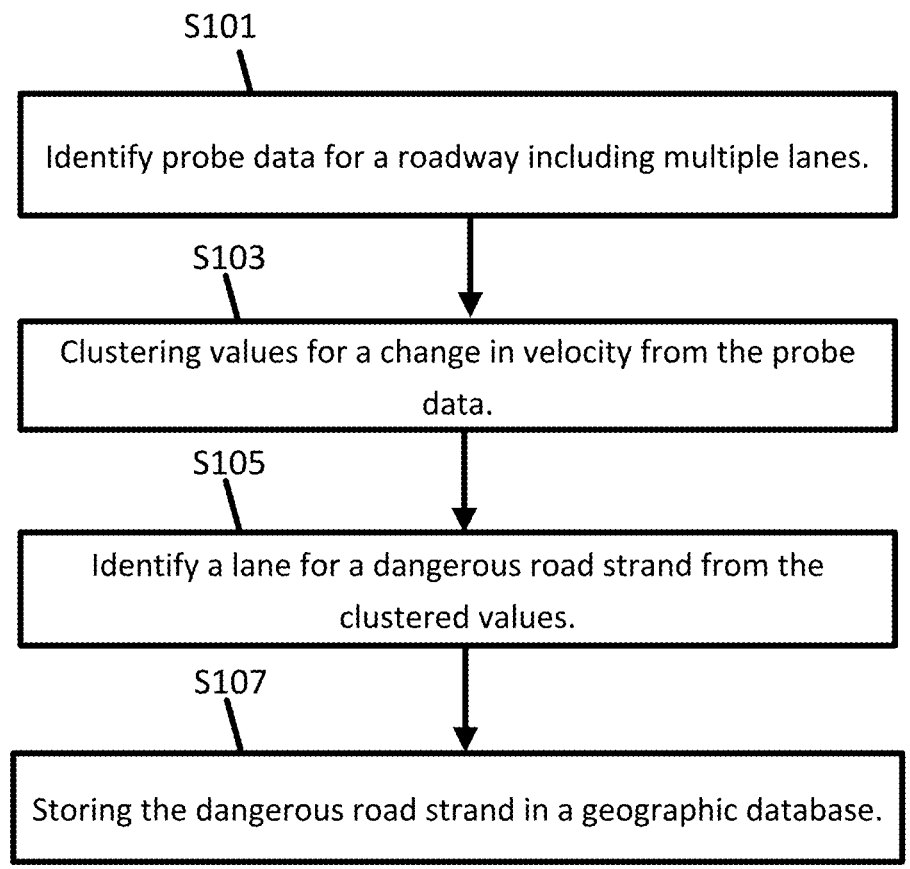
FIG. 11 illustrates an example flow chart for the operations of the server and/or the mobile device.
Figure 12:
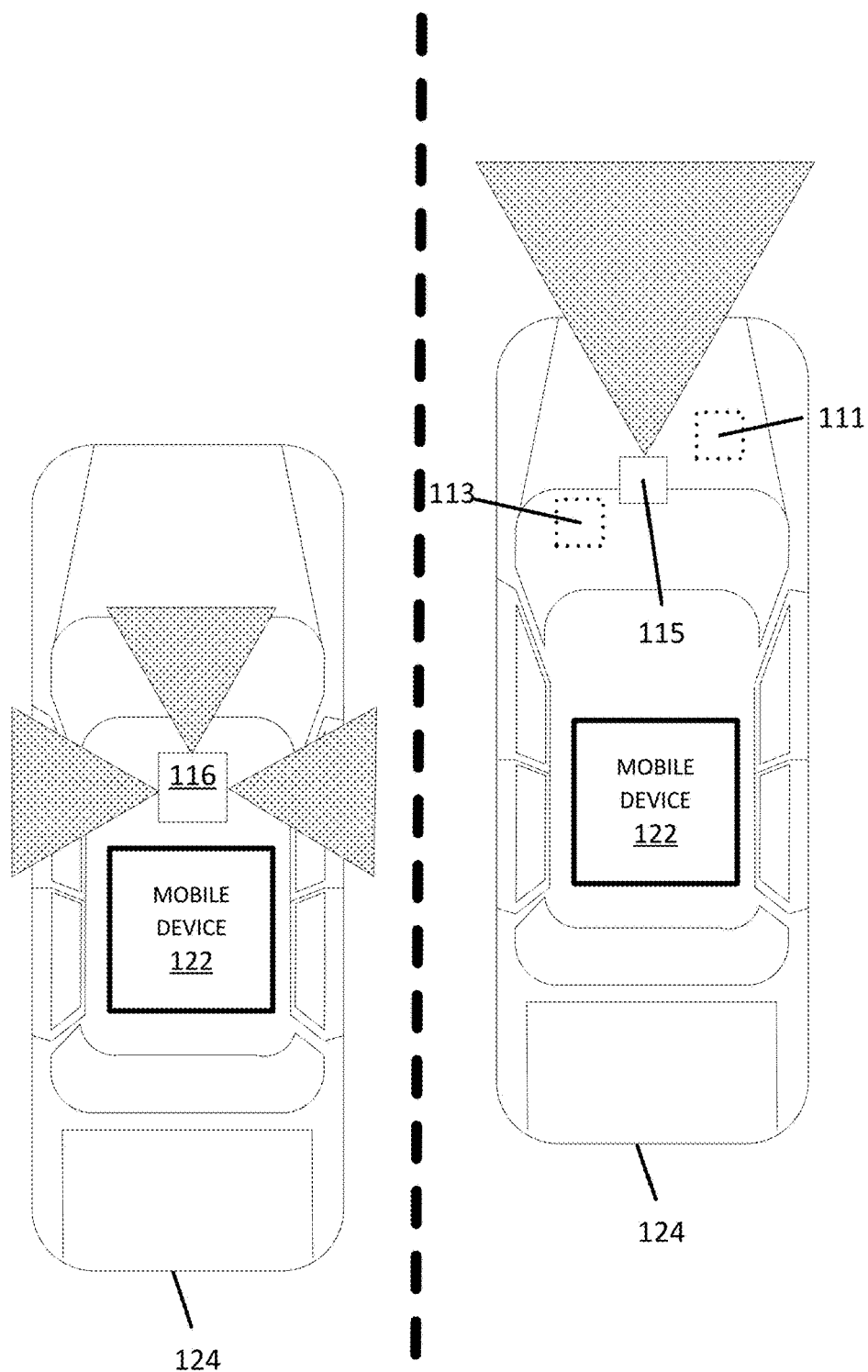
FIG. 12 illustrates exemplary vehicles of the systems of FIG. 1.

FIG. 11 illustrates an example flow chart for the operations of the server and/or the mobile device. Either the mobile device 122 or the server 125 performs the acts of FIG. 11. The operations of the processor 200 or the processor 300 in the alternative may be described with respect to a controller. Additional, different, or fewer acts may be provided. The resulting lane danger or safety predictions may be provided back to the mobile device 122 or other mobile devices 122 for the location based service.

At act S101, the controller identifies probe data for a roadway having multiple lanes. The probe data may be historical data collected over time by mobile device 122 or by sensors adjacent to the roadway. The sensors adjacent to the roadway may include cameras or roadway sensors. The camera may be mounted to collected images of the roadway that are analyzed to detect vehicles and the speed of those vehicles. The roadway sensors may include induction sensors or weight sensors in the road that detect passing vehicles. The probe data may also be real time data. The term real time means that the data is analyzed as it's collected or in batches that are collected over a short duration (e.g., a time epoch). The probe data includes location data and/or speed data and may be collected using GNSS or another location detection system.

The processor 200 or the processor 300 may include network a probe data analyzer including an application specific module or processor that filters the probe data according to time, shape of road, and other factors. The processor is an example means for identifying probe data for the roadway. Alternatively, the communication interface 205 or the communication interface 305 are example means for receiving the road network data.

At act S103, the controller clusters values for a change in velocity based on the probe data. The probe data is organized based on locations and speeds. First, the probe data may be sorted according to separate lanes of the roadway. Next, for each lane, the data is grouped according to the speed to identify location that have had sudden deceleration or jerks. The sub-segment and lane-number where this sudden deceleration occurred is recorded/stored with the time of day and current weather. As this process is repeated, clusters or hot spots are identified on the road segment as areas where sudden-breaking is most prevalent and the times and weather it happened. A clustering algorithm like DBSCAN is used to aggregate together road-segment-lanes (RSL) where sudden-breaking is high. This is done by tuning the clustering algorithm to optimize the similarity in time, weather, SB metric magnitude (deceleration rate), a count of the occurrences of the detected decelerations, proximity in road and lane. The algorithm may automatically discover clusters of sudden braking on a lane of the road and group them as one cluster. The clustering algorithm returns a mean of the cluster, which will contain a component of all the road segment/link ID in the cluster, the lane number, the time and weather.

The processor 200 or the processor 300 may include a clustering module including an application specific module or processor that clusters values for a change in velocity based on the probe data. The processor is an example means for clustering values for a change in velocity based on the probe data.

At act S105, the controller identifies a lane for the multiple lanes for a dangerous road strand from the clustered values. The road segments or road links in the cluster are sequentially grouped to form the dangerous road strand. The average sudden braking frequency provides a frequency value corresponding to the degree of how dangerous driving the segment is.

The processor 200 or the processor 300 may include a dangerous lane strand module including an application specific module or processor that identifies a lane for the multiple lanes for a dangerous road strand from the clustered values. The processor is an example means for identifying a lane for the multiple lanes for a dangerous road strand from the clustered values.

At act S107, the controller stores the dangerous road strand in a geographic database or in memory and in association with the identified lane for the roadway. The server 125 may distribute the dangerous road strand to other mobile devices 122 in response to a routing request or map request. The dangerous road strand may also be returned in response to the request only when other conditions of met such as the type and intensity of the current weather or as listed in the request.

The processor 200 or the processor 300 may include an addressing module including an application specific module or processor that assigns memory or database locations for the dangerous road strand. The memory 204 or memory 301 is an example means for storing the dangerous road strand in a geographic database or in memory and in association with the identified lane for the roadway.

Figure 13:
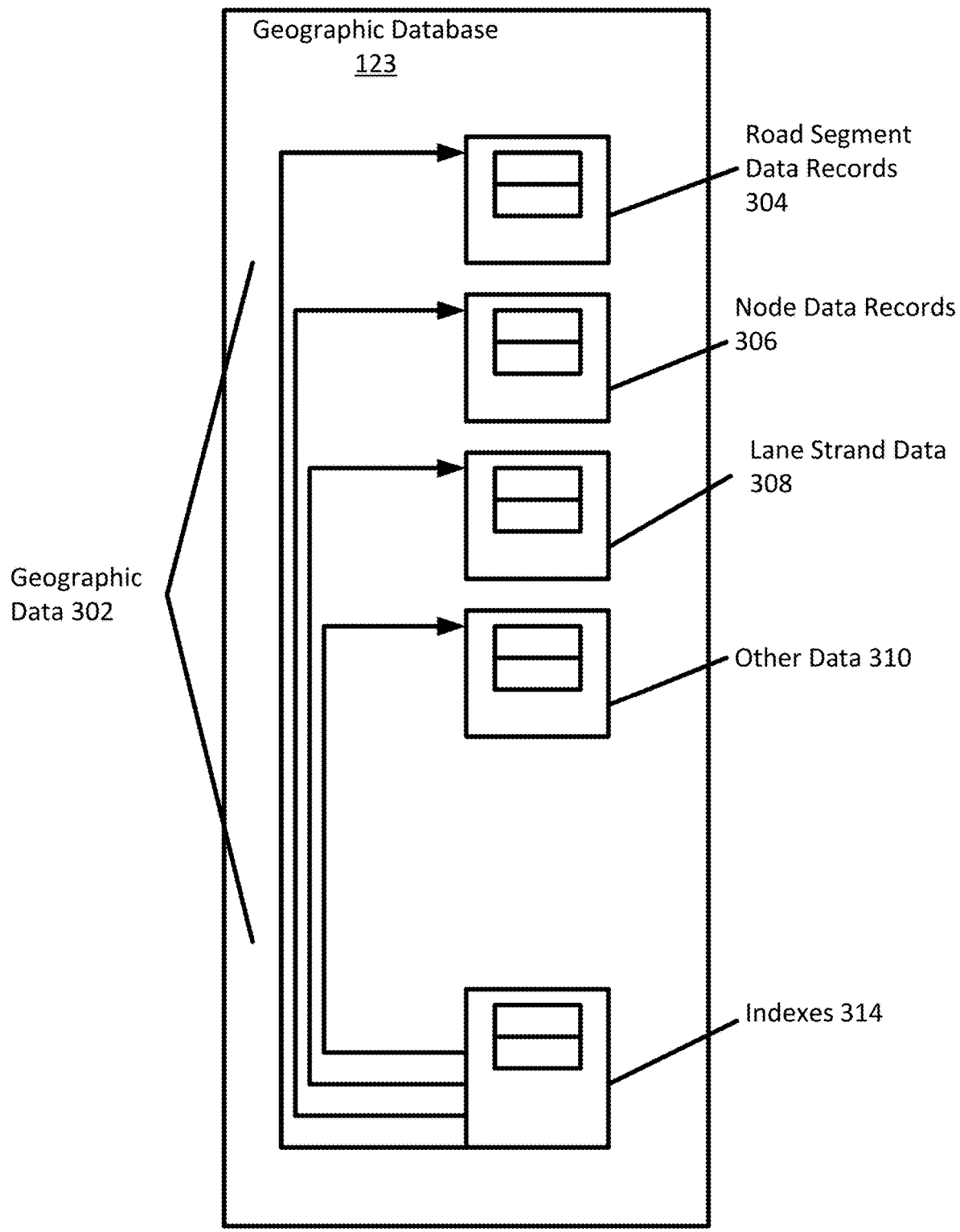
FIGS. 13 and 14 illustrate example geographic databases.

FIG. 13 illustrates an exemplary vehicle 124 of the system of FIG. 1. The vehicles 124 may include a variety of devices such as a global positioning system, a dead reckoning-type system, cellular location system, or combinations of these or other systems, which may be referred to as position circuitry or a position detector. The positioning circuitry may include suitable sensing devices that measure the traveling distance, speed, direction, and so on, of the vehicle 124. The positioning system may also include a receiver and correlation chip to obtain a GPS or GNSS signal. Alternatively or additionally, the one or more detectors or sensors may include an accelerometer built or embedded into or within the interior of the vehicle 124. The vehicle 124 may include one or more distance data detection device or sensor, such as a light detection and ranging (LiDAR) device. The distance data detection sensor may generate point cloud data. The distance data detection sensor may include a laser range finder that rotates a mirror directing a laser to the surroundings or vicinity of the collection vehicle on a roadway or another collection device on any type of pathway.

A connected vehicle includes a communication device and an environment sensor array for reporting the surroundings of the vehicle 124 to the server 125. The connected vehicle may include an integrated communication device coupled with an in-dash navigation system. The connected vehicle may include an ad-hoc communication device such as a mobile device 122 or smartphone in communication with a vehicle system. The communication device connects the vehicle to a network including at least one other vehicle and at least one server. The network may be the Internet or connected to the internet.

The sensor array may include one or more sensors configured to detect surroundings of the vehicle 124. The sensor array may include multiple sensors. Example sensors include an optical distance system such as LiDAR 116, an image capture system 115 such as a camera, a sound distance system such as sound navigation and ranging (SONAR), a radio distancing system such as radio detection and ranging (RADAR) or another sensor. The camera may be a visible spectrum camera, an infrared camera, an ultraviolet camera or another camera.

In some alternatives, additional sensors may be included in the vehicle 124. An engine sensor 111 may include a throttle sensor that measures a position of a throttle of the engine or a position of an accelerator pedal, a brake sensor that measures a position of a braking mechanism or a brake pedal, or a speed sensor that measures a speed of the engine or a speed of the vehicle wheels. Another additional example, vehicle sensor 113, may include a steering wheel angle sensor, a speedometer sensor, or a tachometer sensor.

A mobile device 122 may be integrated in the vehicle 124, which may include assisted driving vehicles such as autonomous vehicles, highly assisted driving (HAD), and advanced driving assistance systems (ADAS). Any of these assisted driving systems may be incorporated into mobile device 122. Alternatively, an assisted driving device may be included in the vehicle 124. The assisted driving device may include memory, a processor, and systems to communicate with the mobile device 122. The assisted driving vehicles may respond to the predicted traffic levels for future road links, or road links on the current route of the vehicle 124, and other geographic data received from geographic database 123 and the server 125 to generate driving commands or navigation commands.

The term autonomous vehicle may refer to a self-driving or driverless mode in which no passengers are required to be on board to operate the vehicle. An autonomous vehicle may be referred to as a robot vehicle or an automated vehicle. The autonomous vehicle may include passengers, but no driver is necessary. These autonomous vehicles may park themselves or move cargo between locations without a human operator. Autonomous vehicles may include multiple modes and transition between the modes. The autonomous vehicle may steer, brake, or accelerate the vehicle based on the position of the vehicle in order, and may respond to the detected lane features and/or other geographic data received from geographic database 123 and the server 125 to generate driving commands or navigation commands. For example, the may provide a driving command to the vehicle 124 based on the dangerous lane strand. The driving command may identify a lane change in response to the lane feature in order to select a lower cost lane (e.g., safer lane).

A highly assisted driving (HAD) vehicle may refer to a vehicle that does not completely replace the human operator. Instead, in a highly assisted driving mode, the vehicle may perform some driving functions and the human operator may perform some driving functions. Vehicles may also be driven in a manual mode in which the human operator exercises a degree of control over the movement of the vehicle. The vehicles may also include a completely driverless mode. Other levels of automation are possible. The HAD vehicle may control the vehicle through steering or braking in response to the on the position of the vehicle and may respond to the dangerous lane strands and other geographic data received from geographic database 123 and the server 125 to generate driving commands or navigation commands.

Similarly, ADAS vehicles include one or more partially automated systems in which the vehicle alerts the driver. The features are designed to avoid collisions automatically. Features may include adaptive cruise control, automate braking, or steering adjustments to keep the driver in the correct lane. ADAS vehicles may issue warnings for the driver based on the position of the vehicle or based on the dangerous lane strands and other geographic data received from geographic database 123 and the server 125 to generate driving commands or navigation commands.

The routing instructions may be provided by display 211. The mobile device 122 may be configured to execute routing algorithms to determine an optimum route to travel along a road network from an origin location to a destination location in a geographic region. Using input(s) including map matching values from the server 125, a mobile device 122 examines potential routes between the origin location and the destination location to determine the optimum route. The mobile device 122, which may be referred to as a navigation device, may then provide the end user with information about the optimum route in the form of guidance that identifies the maneuvers required to be taken by the end user to travel from the origin to the destination location. Some mobile devices 122 show detailed maps on displays outlining the route, the types of maneuvers to be taken at various locations along the route, locations of certain types of features, and so on. Possible routes may be calculated based on a Dijkstra method, an A-star algorithm or search, and/or other route exploration or calculation algorithms that may be modified to take into consideration assigned cost values of the underlying road segments, which may be determined based on the predicted traffic levels and other factors.

The mobile device 122 may be a personal navigation device ("PND"), a portable navigation device, a mobile phone, a personal digital assistant ("PDA"), a watch, a tablet computer, a notebook computer, and/or any other known or later developed mobile device or personal computer. The mobile device 122 may also be an automobile head unit, infotainment system, and/or any other known or later developed automotive navigation system. Non-limiting embodiments of navigation devices may also include relational database service devices, mobile phone devices, car navigation devices, and navigation devices used for air or water travel.

The geometric features may include curvature, slope, or other features. The curvature of a road segment describes a radius of a circle that in part would have the same path as the road segment. The slope of a road segment describes the difference between the starting elevation and ending elevation of the road segment. The slope of the road segment may be described as the rise over the run or as an angle.

The restrictions for traveling the roads or intersections may include turn restrictions, travel direction restrictions, speed limits, lane travel restrictions or other restrictions. Turn restrictions define when a road segment may be traversed onto another adjacent road segment. For example, when a node includes a "no left turn" restriction, vehicles are prohibited from turning left from one road segment to an adjacent road segment. Turn restrictions may also restrict that travel from a particular lane through a node. For example, a left turn lane may be designated so that only left turns (and not traveling straight or turning right) is permitted from the left turn late. Another example of a turn restriction is a "no U-turn" restriction.

Travel direction restriction designate the direction of travel on a road segment or a lane of the road segment. The travel direction restriction may designate a cardinal direction (e.g., north, southwest, etc.) or may designate a direction from one node to another node. The roadway features may include the number of lanes, the width of the lanes, the functional classification of the road, or other features that describe the road represented by the road segment. The functional classifications of roads may include different levels accessibility and speed. An arterial road has low accessibility but is the fastest mode of travel between two points. Arterial roads are typically used for long distance travel. Collector roads connect arterial roads to local roads. Collector roads are more accessible and slower than arterial roads. Local roads are accessible to individual homes and business. Local roads are the most accessible and slowest type of road.

The databases may also include other attributes of or about the roads such as, for example, geographic coordinates, street names, address ranges, speed limits, turn restrictions at intersections, and/or other navigation related attributes (e.g., one or more of the road segments is part of a highway or toll way, the location of stop signs and/or stoplights along the road segments), as well as points of interest (POIs), such as gasoline stations, hotels, restaurants, museums, stadiums, offices, automobile dealerships, auto repair shops, buildings, stores, parks, etc. The databases may also contain one or more node data record(s) which may be associated with attributes (e.g., about the intersections) such as, for example, geographic coordinates, street names, address ranges, speed limits, turn restrictions at intersections, and other navigation related attributes, as well as POIs such as, for example, gasoline stations, hotels, restaurants, museums, stadiums, offices, automobile dealerships, auto repair shops, buildings, stores, parks, etc. The geographic data may additionally or alternatively include other data records such as, for example, POI data records, topographical data records, cartographic data records, routing data, and maneuver data.

In FIG. 13, the geographic database 123 may contain at least one road segment database record 304 (also referred to as "entity" or "entry") for each road segment in a particular geographic region. The geographic database 123 may also include a node database record 306 (or "entity" or "entry") for each node in a particular geographic region. The terms "nodes" and "segments" represent only one terminology for describing these physical geographic features, and other terminology for describing these features is intended to be encompassed within the scope of these concepts. The geographic database 123 may also include location fingerprint data for specific locations in a particular geographic region.

The geographic database 123 may include other kinds of data 310. The other kinds of data 310 may represent other kinds of geographic features or anything else. The other kinds of data may include POI data. For example, the POI data may include POI records comprising a type (e.g., the type of POI, such as restaurant, hotel, city hall, police station, historical marker, ATM, golf course, etc.), location of the POI, a phone number, hours of operation, etc.

The geographic database 123 also includes indexes 314. The indexes 314 may include various types of indexes that relate the different types of data to each other or that relate to other aspects of the data contained in the geographic database 123. For example, the indexes 314 may relate the nodes in the node data records 306 with the end points of a road segment in the road segment data records 304.

As another example, the indexes 314 may relate lane level danger or safety condition using the lane strand data 308. The lane strand data 308 may list one or more road segments and corresponding lanes that have a danger value or sudden braking metric higher than a threshold. Alternatively, the lane strand data 308 may include the danger value or sudden braking metric for all lanes or road segments. The lane strand data 308 may include different values for different times of day or days of week.

The geographic database 123 may also include other attributes of or about roads such as, for example, geographic coordinates, physical geographic features (e.g., lakes, rivers, railroads, municipalities, etc.) street names, address ranges, speed limits, turn restrictions at intersections, and/or other navigation related attributes (e.g., one or more of the road segments is part of a highway or toll way, the location of stop signs and/or stoplights along the road segments), as well as POIs, such as gasoline stations, hotels, restaurants, museums, stadiums, offices, automobile dealerships, auto repair shops, buildings, stores, parks, municipal facilities, other businesses, etc. The geographic database 123 may also contain one or more node data record(s) 306 which may be associated with attributes (e.g., about the intersections) such as, for example, geographic coordinates, street names, address ranges, speed limits, turn restrictions at intersections, and other navigation related attributes, as well as POIs such as, for example, gasoline stations, hotels, restaurants, museums, stadiums, offices, automobile dealerships, auto repair shops, buildings, stores, parks, etc. The geographic data 302 may additionally or alternatively include other data records such as, for example, POI data records, topographical data records, cartographic data records, routing data, and maneuver data. Other contents of the database 123 may include temperature, altitude or elevation, lighting, sound or noise level, humidity, atmospheric pressure, wind speed, the presence of magnetic fields, electromagnetic interference, or radio- and micro-waves, cell tower and wi-fi information, such as available cell tower and wi-fi access points, and attributes pertaining to specific approaches to a specific location.

Figure 14:
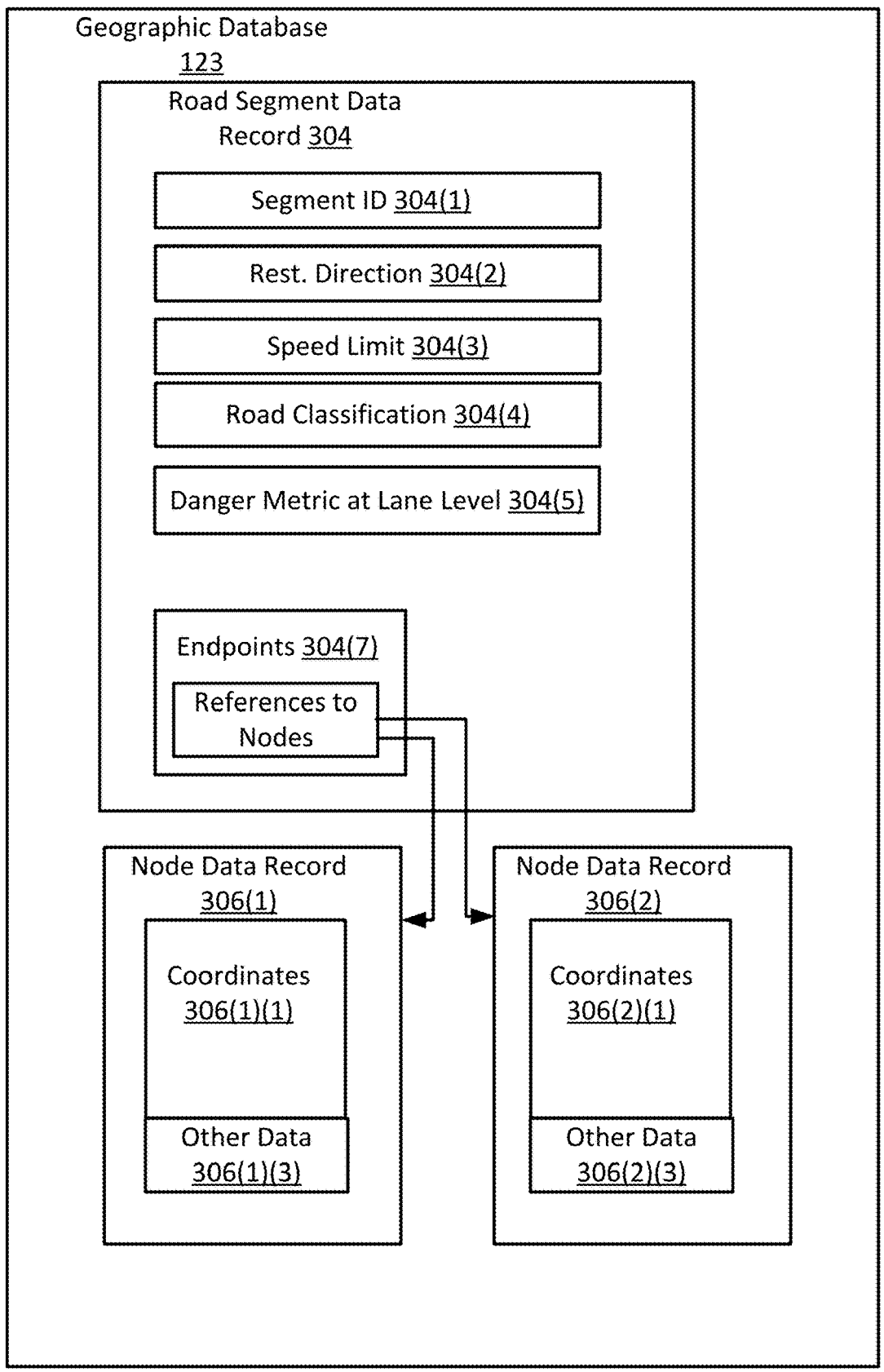

FIG. 14 shows some of the components of a road segment data record 304 contained in the geographic database 123 according to one embodiment. The road segment data record 304 may include a segment ID 304(1) by which the data record can be identified in the geographic database 123. Each road segment data record 304 may have associated with it information (such as "attributes", "fields", etc.) that describes features of the represented road segment. The road segment data record 304 may include data 304(2) that indicate the restrictions, if any, on the direction of vehicular travel permitted on the represented road segment. The road segment data record 304 may include data 304(3) that indicate a speed limit or speed category (i.e., the maximum permitted vehicular speed of travel) on the represented road segment. The road segment data record 304 may also include classification data 304(4) indicating whether the represented road segment is part of a controlled access road (such as an expressway), a ramp to a controlled access road, a bridge, a tunnel, a toll road, a ferry, and so on. The road segment data record may include location fingerprint data, for example a set of sensor data for a particular location.

The geographic database 123 may include road segment data records 304 (or data entities) that describe predicted danger levels 304(5) according to individual lanes of the road segment. The predicted danger levels 304(5) may include a predicted level for a current time as well as future times. The predicted danger levels 304(5) may be listed for all time epochs.

Additional schema may be used to describe road objects. The attribute data may be stored in relation to a link/segment 304, a node 306, a strand of links, a location fingerprint, an area, or a region. The geographic database 123 may store information or settings for display preferences. The geographic database 123 may be coupled to a display. The display may be configured to display the roadway network and data entities using different colors or schemes.

The road segment data record 304 also includes data 304(7) providing the geographic coordinates (e.g., the latitude and longitude) of the end points of the represented road segment. In one embodiment, the data 304(7) are references to the node data records 306 that represent the nodes corresponding to the end points of the represented road segment.

The road segment data record 304 may also include or be associated with other data 304(7) that refer to various other attributes of the represented road segment. The various attributes associated with a road segment may be included in a single road segment record or may be included in more than one type of record which cross-references to each other. For example, the road segment data record 304 may include data identifying what turn restrictions exist at each of the nodes which correspond to intersections at the ends of the road portion represented by the road segment, the name, or names by which the represented road segment is identified, the street address ranges along the represented road segment, and so on.

FIG. 14 also shows some of the components of a node data record 306 that may be contained in the geographic database 123. Each of the node data records 306 may have associated information (such as "attributes", "fields", etc.) that allows identification of the road segment(s) that connect to it and/or its geographic position (e.g., its latitude and longitude coordinates). The node data records 306(1) and 306(2) include the latitude and longitude coordinates 306(1)(1) and 306(2)(1) for their node, the node data records 306(1) and 306(2) may also include other data 306(1)(3) and 306(2)(3) that refer to various other attributes of the nodes, which may include danger levels for the node. The danger level for a lane entering or leaving the node may be used as the danger level of the node. When calculating a route, the route may be selected in response to the danger level of the node so that lower danger levels are selected.

The geographic database 123 may be maintained by a content provider (e.g., a map developer). By way of example, the map developer may collect geographic data to generate and enhance the geographic database 123. The map developer may obtain data from sources, such as businesses, municipalities, or respective geographic authorities. In addition, the map developer may employ field personnel to travel throughout a geographic region to observe features and/or record information about the roadway. Remote sensing, such as aerial or satellite photography, may be used. The database 123 may be incorporated in or connected to the server 125.

The geographic database 123 and the data stored within the geographic database 123 may be licensed or delivered on-demand. Other navigational services or traffic server providers may access the location fingerprint data, traffic data and/or the lane line object data stored in the geographic database 123.

The processor 200 and/or processor 300 may include a general processor, digital signal processor, an application specific integrated circuit (ASIC), field programmable gate array (FPGA), analog circuit, digital circuit, combinations thereof, or other now known or later developed processor. The processor 200 and/or processor 300 may be a single device or combinations of devices, such as associated with a network, distributed processing, or cloud computing.

The memory 204 and/or memory 301 may be a volatile memory or a non-volatile memory. The memory 204 and/or memory 301 may include one or more of a read only memory (ROM), random access memory (RAM), a flash memory, an electronic erasable program read only memory (EEPROM), or other type of memory. The memory 204 and/or memory 801 may be removable from the mobile device 122, such as a secure digital (SD) memory card.

The communication interface 205 and/or communication interface 305 may include any operable connection. An operable connection may be one in which signals, physical communications, and/or logical communications may be sent and/or received. An operable connection may include a physical interface, an electrical interface, and/or a data interface. The communication interface 205 and/or communication interface 305 provides for wireless and/or wired communications in any now known or later developed format.

The databases 123 may include geographic data used for traffic and/or navigation-related applications. The geographic data may include data representing a road network or system including road segment data and node data. The road segment data represent roads, and the node data represent the ends or intersections of the roads. The road segment data and the node data indicate the location of the roads and intersections as well as various attributes of the roads and intersections. Other formats than road segments and nodes may be used for the geographic data. The geographic data may include structured cartographic data or pedestrian routes.

The databases may include historical traffic speed data for one or more road segments. The databases may also include traffic attributes for one or more road segments. A traffic attribute may indicate that a road segment has a high probability of traffic congestion.

The input device 203 may be one or more buttons, keypad, keyboard, mouse, stylus pen, trackball, rocker switch, touch pad, voice recognition circuit, or other device or component for inputting data to the mobile device 122. The input device 203 and display 211 may be combined as a touch screen, which may be capacitive or resistive. The display 211 may be a liquid crystal display (LCD) panel, light emitting diode (LED) screen, thin film transistor screen, or another type of display. The output interface of the display 211 may also include audio capabilities, or speakers. In an embodiment, the input device 203 may involve a device having velocity detecting abilities.

The positioning circuitry 207 may include suitable sensing devices that measure the traveling distance, speed, direction, and so on, of the mobile device 122. The positioning system may also include a receiver and correlation chip to obtain a GPS signal. Alternatively or additionally, the one or more detectors or sensors may include an accelerometer and/or a magnetic sensor built or embedded into or within the interior of the mobile device 122. The accelerometer is operable to detect, recognize, or measure the rate of change of translational and/or rotational movement of the mobile device 122. The magnetic sensor, or a compass, is configured to generate data indicative of a heading of the mobile device 122. Data from the accelerometer and the magnetic sensor may indicate orientation of the mobile device 122. The mobile device 122 receives location data from the positioning system. The location data indicates the location of the mobile device 122.

The positioning circuitry 207 may include a Global Positioning System (GPS), Global Navigation Satellite System (GLONASS), or a cellular or similar position sensor for providing location data. The positioning system may utilize GPS-type technology, a dead reckoning-type system, cellular location, or combinations of these or other systems. The positioning circuitry 207 may include suitable sensing devices that measure the traveling distance, speed, direction, and so on, of the mobile device 122. The positioning system may also include a receiver and correlation chip to obtain a GPS signal. The mobile device 122 receives location data from the positioning system. The location data indicates the location of the mobile device 122.

The position circuitry 207 may also include gyroscopes, accelerometers, magnetometers, or any other device for tracking or determining movement of a mobile device. The gyroscope is operable to detect, recognize, or measure the current orientation, or changes in orientation, of a mobile device. Gyroscope orientation change detection may operate as a measure of yaw, pitch, or roll of the mobile device.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry. In an embodiment, a vehicle may be considered a mobile device, or the mobile device may be integrated into a vehicle.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. These examples may be collectively referred to as a non-transitory computer readable medium.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

I claim:

1. A method for identifying a road strand, below a baseline safety level, of a roadway to reduce driving errors or accidents, the method further comprising:
    identifying probe data for a roadway having a plurality of lanes;
    selecting a subset of the probe data for a predetermined lane of the plurality of lanes;
    calculating values for a change in velocity between a first velocity and a second velocity, over a predetermined time interval or a predetermined distance interval, for multiple sequences in the subset of the probe data;
    clustering values for the change in velocity between the first velocity and the second velocity, over a predetermined time interval or a predetermined distance interval, based on a danger value;
    identifying the road strand, below the baseline safety level, from the clustered values; and
    storing the road strand, below the baseline safety level, in a geographic database in association with the predetermined lane for the roadway.

2. The method of claim 1, further comprising:
    receiving an external measurement associated with the probe data.

3. The method of claim 2, wherein the subset of the probe data is selected for the predetermined lane based on the external measurement.

4. The method of claim 2, wherein the external measurement is weather or road conditions.

5. The method of claim 1, wherein each of the multiple sequences in the subset of the probe data include a series of probe data collected by one probe.

6. The method of claim 1, wherein clustering values for the change in velocity between the first velocity and the second velocity, over a predetermined time interval or a predetermined distance interval, based on the danger value comprises:
    comparing location data for the multiple sequences in the subset of the probe data;
    comparing danger values for the multiple sequences in the subset of the probe data; and
    identifying a cluster when the location data falls within a predetermined range and the danger values fall within a predetermined range.

7. The method of claim 1, wherein identifying the road strand, below the baseline safety level, from the clustered values comprises:
    determining one or more road segments in response to the clustered values.

8. The method of claim 1, further comprising:
    generating a map including a first designation for the identified road strand, below the baseline safety level, and a second designation for another portion of the roadway.

9. The method of claim 8, wherein the first designation and the second designation are different colors.

10. The method of claim 1, further comprising:
    assigning a cost to the road strand, below the baseline safety level, wherein the cost corresponds to a comparison of road segments by a routing algorithm.

11. The method of claim 1, further comprising:
    calculating a route from an origin to a destination including at least one instruction in response to the road strand, below the baseline safety level.

12. The method of claim 1, further comprising:
    generating a warning in response to the road strand, below the baseline safety level.

13. An apparatus for identifying map data including at least one road strand, below a baseline safety level, of a roadway to reduce driving errors or accidents, the apparatus further comprising:
    a road network module configured to identify probe data for a roadway having a plurality of lanes and select a subset of the probe data for a predetermined lane of the plurality of lanes;
    a speed comparison module configured to calculate values for a change in velocity between a first velocity and a second velocity, over a predetermined time interval or a predetermined distance interval, for multiple sequences in the subset of the probe data;
    a clustering module configured to cluster values for the change in velocity between the first velocity and the second velocity, over a predetermined time interval or a predetermined distance interval, based on a sudden braking value; and
    a road strand module configured to identify the road strand, below the baseline safety level, from the clustered values.

14. The apparatus of claim 13, further comprising:
    a geographic database configured to store the road strand, below the baseline safety level, in a geographic database in association with the predetermined lane for the roadway.

15. The apparatus of claim 13, further comprising:
an annunciator configured to provide a warning in response to the road strand, below the baseline safety level.

16. The apparatus of claim 13, wherein the clustering module is configured to filter values for the change in velocity between the first velocity and the second velocity, over a predetermined time interval or a predetermined distance interval, based on an external measurement for weather or road conditions associated with the probe data.

17. The apparatus of claim 13, wherein the road strand module is configured to calculate the sudden braking value (SB) according to a relationship, $$SB=|AD|*F \div Q,$$

wherein an average deceleration (AD) is the change in velocity, a frequency (F) is a number of clustered measurements and a trajectory quantity (Q) is a number of total probes.

18. A non-transitory computer readable medium for identifying a road strand, below a baseline safety level, of a roadway to reduce driving errors or accidents, the medium including instructions that when executed by a processer are configured to perform:
identifying probe data for a roadway having a plurality of lanes;
clustering values for a change in velocity between a first velocity and a second velocity, over a predetermined time interval or a predetermined distance interval, based on the probe data;
identifying a lane for the plurality of lanes for a road strand, below the baseline safety level, from the clustered values; and
storing the road strand, below the baseline safety level, in a geographic database in association with the identified lane for the roadway.

19. The non-transitory computer readable medium of claim 18, wherein the identified probe data is filtered for a weather condition or a road condition.

20. A method for identifying a road strand, below a baseline safety level, of a roadway to reduce driving errors or accidents, the method comprising:
identifying probe data for a roadway having a plurality of lanes;
selecting a subset of the probe data for a predetermined lane of the plurality of lanes;
calculating values for a change in velocity for multiple sequences in the subset of the probe data;
calculating a danger value (DV) according to a relationship,
$DV=|AD|*F \div Q$, wherein an average deceleration (AD) is the change in velocity, a frequency (F) is a number of clustered measurements and a trajectory quantity (Q) is a number of total probes;
clustering values for the change in velocity based on the danger value;
identifying the road strand, below the baseline safety level, from the clustered values; and
storing the road strand, below the baseline safety level, in a geographic database in association with the predetermined lane for the roadway.

* * * * *